(12) United States Patent
Cho et al.

(10) Patent No.: US 9,970,754 B2
(45) Date of Patent: *May 15, 2018

(54) SURFACE MEASUREMENT DEVICE AND METHOD THEREOF

(71) Applicant: INDUSTRIAL TECHNOLOGY RESEARCH INSTITUTE, Hsinchu (TW)

(72) Inventors: Chia-Hung Cho, Hsinchu (TW); Kai-Ping Chuang, Hsinchu County (TW); Yi-Wei Chang, Yilan County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days. days.

This patent is subject to a terminal disclaimer.

(21) Appl. No.: 15/249,298

(22) Filed: Aug. 26, 2016

(65) Prior Publication Data

US 2017/0059311 A1 Mar. 2, 2017

Related U.S. Application Data

(63) Continuation-in-part of application No. 14/934,607, filed on Nov. 6, 2015, now Pat. No. 9,835,449.

(30) Foreign Application Priority Data

Aug. 26, 2015 (TW) .............................. 104127948 A
Aug. 18, 2016 (TW) .............................. 105126442 A

(51) Int. Cl.
*G01B 11/30* (2006.01)
*G01B 11/06* (2006.01)
*B24B 37/20* (2012.01)

(52) U.S. Cl.
CPC ............ *G01B 11/303* (2013.01); *B24B 37/20* (2013.01); *G01B 11/0608* (2013.01)

(58) Field of Classification Search
CPC ....... B24B 37/20; B24B 37/107; B24B 29/10; B24B 7/00; G01B 7/105; G01B 7/107;
(Continued)

(56) References Cited

U.S. PATENT DOCUMENTS 5,618,447 A 4/1997 Sandhu
5,708,506 A 1/1998 Birang
(Continued)

FOREIGN PATENT DOCUMENTS

CN 101501785 A 8/2009
CN 102338629 A 2/2012
(Continued)

OTHER PUBLICATIONS

TW Office Action dated Jan. 16, 2017 as received in Application No. 105126442.
(Continued)

*Primary Examiner* — Hoa Pham
(74) *Attorney, Agent, or Firm* — Maschoff Brennan

(57) ABSTRACT

A surface measurement device includes a rotating platform, a motion lever, a measuring module and a control module. The rotating platform rotates an object at a rotating speed. The motion lever is above the rotating platform. The measuring module moves to a variety of measuring positions on the motion lever. When the measuring module is at one of the measuring positions, the measuring module measures the heights of a plurality of sampling points on the surface of the object in a sampling frequency. The control module selectively modifies the rotating speed of the rotating platform or the sampling frequency of the measuring module according to the measuring position of the measuring module to make (Continued)

the distance between the sampling points in at least a region of the surface of the object match a sampling rule.

48 Claims, 20 Drawing Sheets

(58) Field of Classification Search
CPC . G01B 11/0608; G01B 11/306; G01B 11/026; G01B 11/303
USPC .................................................. 356/601–635
See application file for complete search history.

(56) References Cited

U.S. PATENT DOCUMENTS

| | | | |
|---|---|---|---|
| 5,733,171 | A | 3/1998 | Allen et al. |
| 5,993,289 | A | 11/1999 | Allen et al. |
| 6,040,244 | A | 3/2000 | Arai et al. |
| 6,194,231 | B1 | 2/2001 | Ho-Cheng et al. |
| 6,343,974 | B1* | 2/2002 | França ................. B24B 49/10 451/10 |
| 7,066,786 | B2 | 6/2006 | Fujishima et al. |
| 7,201,632 | B2 | 4/2007 | Elledge |
| 7,235,488 | B2 | 6/2007 | Elledge |
| 7,306,506 | B2 | 12/2007 | Elledge |
| 7,747,101 | B2 | 6/2010 | Matsuzawa et al. |
| 8,554,356 | B2 | 10/2013 | Shimizu et al. |
| 8,773,757 | B2 | 7/2014 | Chen et al. |
| 8,992,286 | B2* | 3/2015 | Cherian ................. B24B 49/12 451/285 |
| 9,067,296 | B2 | 6/2015 | Ono et al. |
| 9,156,122 | B2* | 10/2015 | Shinozaki ............. B24B 37/042 |
| 2004/0259472 | A1 | 12/2004 | Chalmers et al. |
| 2007/0115457 | A1 | 5/2007 | Matsuzawa et al. |
| 2009/0042481 | A1 | 2/2009 | Mavliev et al. |
| 2010/0035518 | A1 | 2/2010 | Chang et al. |
| 2012/0309267 | A1 | 12/2012 | Shinozaki et al. |
| 2014/0138355 | A1* | 5/2014 | Yavelberg ............... B24B 7/228 216/53 |
| 2014/0162534 | A1* | 6/2014 | Lin ................... H01L 21/02021 451/41 |
| 2014/0273752 | A1 | 9/2014 | Bajaj et al. |
| 2017/0059310 | A1* | 3/2017 | Cho ..................... G01B 11/303 |
| 2017/0059311 | A1* | 3/2017 | Cho ..................... G01B 11/303 |

FOREIGN PATENT DOCUMENTS

| | | |
|---|---|---|
| CN | 103862373 A | 6/2014 |
| EP | 2 708 934 B1 | 8/2017 |
| JP | H02-083404 A | 3/1990 |
| JP | H08-61949 A | 3/1996 |
| JP | H10-86056 A | 4/1998 |
| JP | 2004-012302 A | 1/2004 |
| JP | 2005-088128 A | 4/2005 |
| JP | 2005-195545 A | 7/2005 |
| JP | 2006-194846 A | 7/2006 |
| JP | 2007-019434 A | 1/2007 |
| JP | 2008-268387 A | 11/2008 |
| JP | 2009-148877 A | 7/2009 |
| JP | 2010-240837 A | 10/2010 |
| JP | 2011-530418 A | 12/2011 |
| JP | 2012-137469 A | 7/2012 |
| JP | 2014-055920 A | 3/2014 |
| JP | 2014-091190 A | 5/2014 |
| TW | I235690 B | 7/2005 |
| TW | 201308412 A1 | 2/2013 |
| TW | M482476 U | 7/2014 |
| TW | 201438845 A | 10/2014 |
| TW | I516992 B | 1/2016 |

OTHER PUBLICATIONS

Wang, H., Liu, Y., Song, Y., Zhao, Y., & Zhao, J. (2012). Fractal dimension analysis on pore structure of artificial cores using magnetic resonance imaging. 2012 2nd International Conference on Consumer Electronics, Communications and Networks (CECNet). doi:10.1109/cecnet.2012.6202182.

Mcgrath, John, and Chris Davis. "Polishing Pad Surface Characterisation in Chemical Mechanical Planarisation." Journal of Materials Processing Technology 153-154 (2004): 666-73. Web.

Lee, E., Cha, J., & Kim, S. (2013). Evaluation of the wafer polishing pad capacity and lifetime in the machining of reliable elevations. International Journal of Machine Tools and Manufacture, 66, 82-94. doi:10.1016/j.jmachtools.2012.11.003.

JP Office Action dated Aug. 15, 2017 as received in Application 2016-162290 [Machine Translation].

* cited by examiner

SURFACE MEASUREMENT DEVICE AND METHOD THEREOF

CROSS-REFERENCE TO RELATED APPLICATIONS

This non-provisional application is a continuation-in-part patent application of U.S. application Ser. No. 14/934,607 filed on Nov. 6, 2015, which claims priority under 35 U.S.C. § 119(a) on Patent Application No(s). 104127948 filed in Taiwan, R.O.C. on Aug. 26, 2015, the entire contents of which are hereby incorporated by reference.

TECHNICAL FIELD

The disclosure relates to a surface measurement device and a method thereof.

BACKGROUND

Typically, when a position to be measured on the surface of a rotating object is closer to a rotating center, points to be sampled are usually closer to each other, and when a position to be measured is father from the rotating center, points to be sampled are usually apart from each other more. This causes that the distribution of points to be sampled is not even on the surface of the object. That is, a typical conventional method of measuring objects in rotation may not provide even sampling the surface of an object, so the surface state of the surface of the object may be inaccurate or may be insufficient to further analyze the surface of the object.

For example, the chemical mechanical polishing (CMP) technology is mostly used in modern technologies to smooth semiconductor wafers' surfaces. For most of CMP devices, a polishing pad in rotation usually moves relative to a semiconductor wafer in order to smooth the surface of the semiconductor wafer. Therefore, in such a chemical-mechanical polishing technology, the roughness of the surface of a polishing pad will affect the quality of smoothing a semiconductor wafer's surface. Therefore, it requires a manner to evenly sample a surface of a polishing pad in rotation. Through this manner, technical personnel can well handle the surface state of a polishing pad, the efficiency of the CMP technology will be greatly enhanced, and the cost of polishing semiconductor wafers will also be controlled well.

SUMMARY

According to one or more embodiments, the disclosure provides a surface measurement device including a rotation platform, a motion lever, a measuring module and a control module. The rotation platform bears an object and rotates the object at a rotating speed. The motion lever is located above the rotation platform. The measuring module is located on the motion lever and is movable to a plurality of measuring positions on the motion lever. When located at one of the measuring positions, the measuring module performs a surface height measurement in a sampling frequency onto a plurality of sampling points on the surface of the object. The control module selectively adjusts the rotating speed of the rotation platform or the sampling frequency of the measuring module according to the measuring position of the measuring module on the motion lever so that the distance between the sampling points in at least a region of the surface of the object matches a sampling rule.

According to one or more embodiments, the disclosure provides another surface measurement device including a rotation platform, a motion lever, a measuring module and a control module. The rotation platform bears an object and rotates the object at a rotating speed. The motion lever is located above the rotation platform. The measuring module includes a light source, a dispersion lens assembly, a spectrometer and a gas injection component. The light source provides a measuring light beam. The dispersion lens assembly is connected to the light source and is movable to a plurality of measuring positions on the motion lever. The spectrometer is connected to the dispersion lens assembly. When the dispersion lens assembly is located one of the measuring positions, the light source projects the measuring light beam in a sampling frequency onto a plurality of sampling points on a surface of the object through the dispersion lens assembly. The spectrometer determines a wavelength intensity distribution by analyzing a reflected light beam reflected from the sampling point. The wavelength intensity distribution is related to a surface height of the sampling point. When the dispersion lens assembly projects the measuring light beam onto the sampling point, the gas injection component performs a surface clean onto the sampling point which is projected. The control module selectively adjusts the rotating speed of the rotation platform or the sampling frequency that the light source projects the measuring light beam through the dispersion lens assembly, according to the position of the dispersion lens assembly on the motion lever so that the distance between the sampling points in at least a region of the surface of the object matches a sampling rule.

According to one or more embodiments, the disclosure provides a surface measurement method including the following steps. An object is rotated at a rotating speed. When located one of a plurality of measuring positions, a measuring module performs a surface height measurement in a sampling frequency onto a plurality of sampling points on a surface of the object. According to the measuring position of the measuring module, the rotating speed of the object or the sampling frequency of the measuring module is selectively adjusted so that the distance between the sampling points in at least a region of the surface of the object matches a sampling rule.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
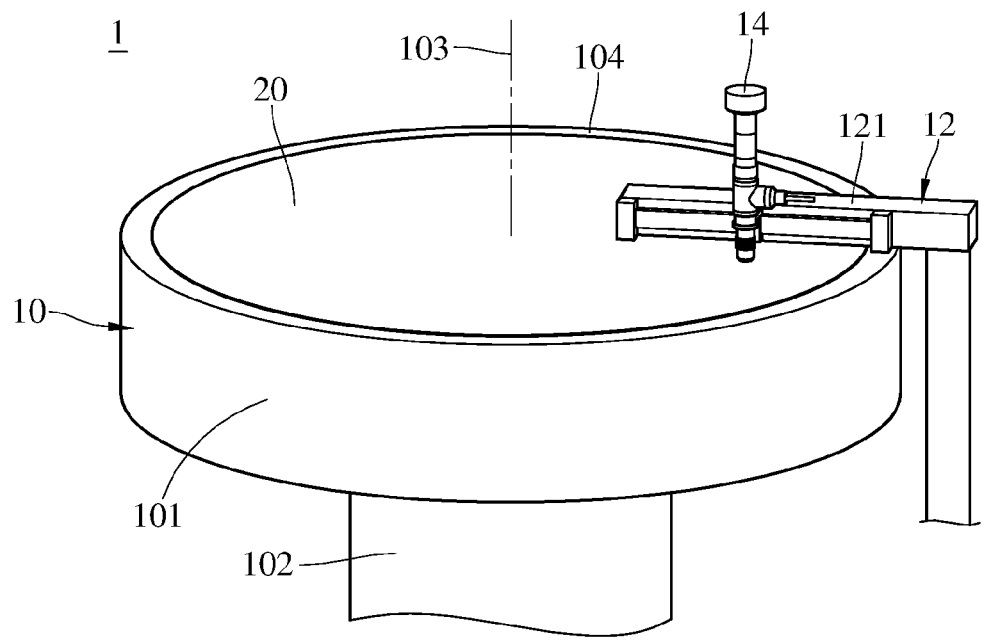
FIG. 1 is a schematic view of a surface measurement device in an embodiment of the disclosure.
Figure 2:
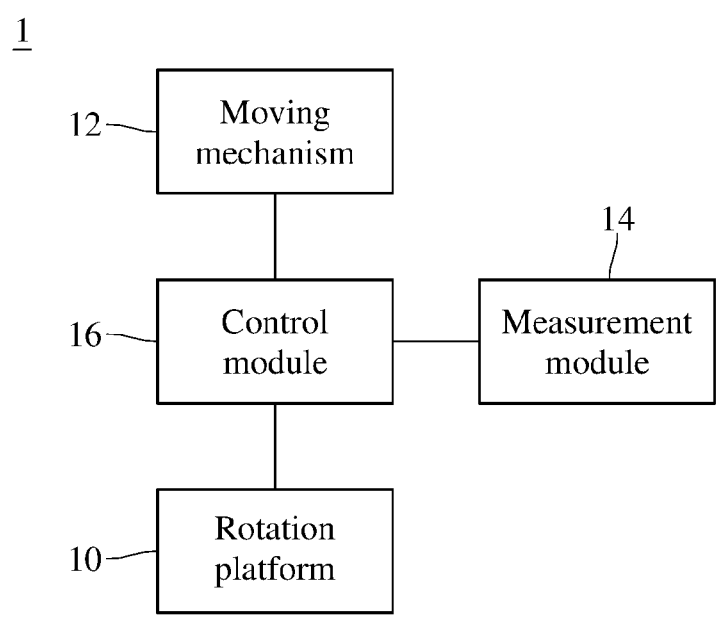
FIG. 2 is a block diagram of the surface measurement device in an embodiment of the disclosure.
Figure 3:
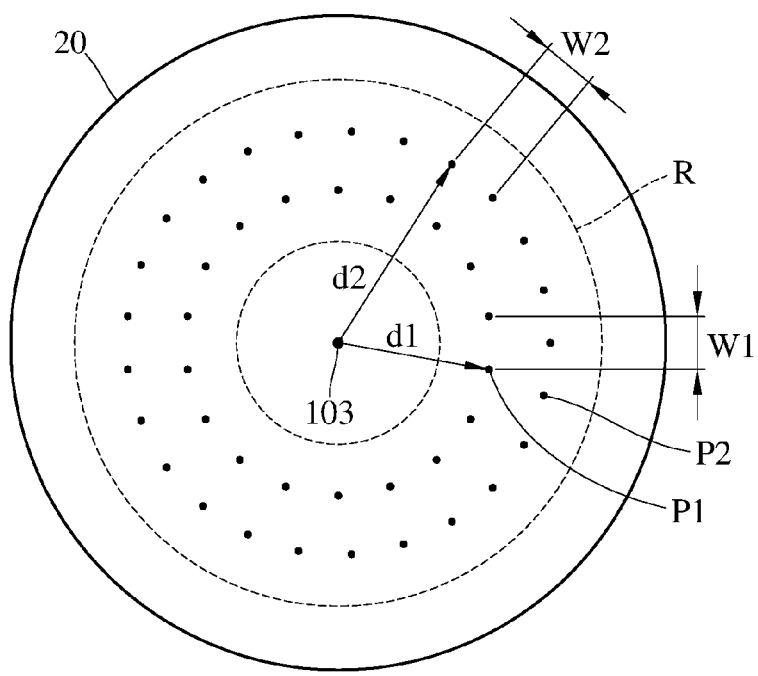
FIG. 3 is a schematic view of sampling points in at least a region of the object in the first embodiment of the disclosure.
Figure 4:
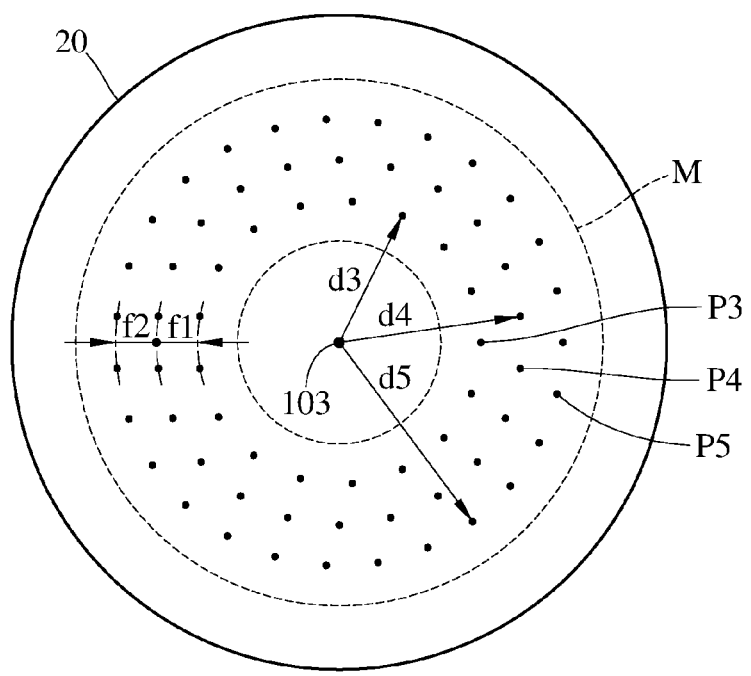
FIG. 4 is a schematic view of sampling points in at least a region of the object in the second embodiment of the disclosure.

Please refer to FIG. 1 to FIG. 4. FIG. 1 is a schematic view of a surface measurement device in an embodiment of the disclosure, FIG. 2 is a block diagram of the surface measurement device in an embodiment of the disclosure, FIG. 3 is a schematic view of sampling points in at least a region of the object in the first embodiment of the disclosure, and FIG. 4 is a schematic view of sampling points in at least a region of the object in the second embodiment of the disclosure. As shown in the figures, a surface measurement device 1 includes a rotation platform 10, a moving mechanism 12, a measuring module 14 and a control module 16. The rotation platform 10 is disposed with an object 20, and the rotation platform 10 rotates the object 20 at a rotating speed. The moving mechanism 12 includes a motion lever 121, which is located above the rotation platform 10. The measuring module 14 is located on the motion lever 121, and the measuring module 14 is movable to a plurality of measuring positions on the motion lever 121. When the measuring module 14 is located at one of the measuring positions, the measuring module 14 will perform a surface height measurement in a sampling frequency onto a plurality of sampling points on the surface of the object. The control module 16 selectively adjusts the rotating speed of the rotation platform 10 or the sampling frequency of the measuring module 14 according to the measuring position of the measuring module 14 on the motion lever 121 so that the distance between the sampling points in at least a region of the surface of the object 20 matches a sampling rule.

In this embodiment, selectively adjusting the rotating speed of the rotation platform 10 or the sampling frequency of the measuring module 14 by the control module 16 is that the control module 16 adjusts the sampling frequency of the measuring module 14 as not changing the rotating speed of the rotation platform 10, or is that the control module 16 adjusts the rotating speed of the rotation platform 10 as not changing the sampling frequency of the measuring module 14, or is that the control module 16 adjusts the rotating speed of the rotation platform 10 and the sampling frequency of the measuring module 14 at the same time, and the details will be described later. In this embodiment, the sampling rule is that any sampling point has the same distance with closest adjacent sampling points, or is that any two adjacent sampling points within the same region of a certain radius have the same distance therebetween, or is that sampling points are arranged along a spiral line whose center is on the rotating axis of the rotation platform 10, and embodiments of the sampling rule will described later.

In an embodiment, the rotation platform 10 includes a carrying platform 101 and a rotating shaft 102. The carrying platform 101 is disposed on the rotating shaft 102 and is rotatable about a rotating axis 103. The carrying platform 101 has a bearing surface 104. For example, the object 20 is a polishing pad, a SiC substrate or a GaN substrate. The object 20 is disposed on the bearing surface 104 of the carrying platform 101, and a surface to be measured of the object 20 faces the measuring module 14. For example, the measuring module 14 is a measuring instrument of chromatic confocal technology or confocal laser technology. The measuring module 14 is movable on the motion lever 121 of the moving mechanism 12, and the extension direction of the motion lever 121 is substantially vertical to the normal line of the bearing surface 104 so that the measuring module 14 can move along the extension direction of the motion lever 121 for a surface height measurement performed onto the surface to be measured of the object 20. The control module 16 is electrically connected to the rotation platform 10, the moving mechanism 12 and the measuring module 14 so that the control module 16 can control the measuring module 14 to move on the motion lever 121 of the moving mechanism 12 and also can adjust the rotating speed of the rotation platform 10 or the sampling frequency of the measuring module 14 according to the measuring position of the measuring module 14 on the motion lever 121.

In practice, in an embodiment, the control module 16 can set the rotating speed of the rotation platform 10 to be a constant value, and adjust the sampling frequency of the measuring module 14 according to which measuring position the measuring module 14 is located on the motion lever 121. In an example, when the measuring position of the measuring module 14 on the motion lever 121 is closer the rotating axis 103, the control module 16 will lower the sampling frequency of the measuring module 14. In other words, when the projection of the measuring module 14 on the surface to be measured of the object 20 has a shorter distance with the rotating axis 103, the sampling frequency of the measuring module 14 should be lowered; and when the projection of the measuring module 14 on the surface to be measured of the object 20 has a longer distance with the rotating axis 103, the sampling frequency of the measuring module 14 should be increased. In this way, a plurality of first sampling points P1 and a plurality of second sampling points P2 obtained in at least a region of the surface of the object 20 by the measuring module 14 match a sampling rule. For example, as shown in the figure, the first sampling points P1 and the second sampling points P2 obtained in at least a region R of the surface of the object 20 match the sampling rule.

In this embodiment, each first sampling point P1 has a first distance d1 with the rotating axis 103, and each second sampling point P2 has a second distance d2 with the rotating axis 103. When the distance w1 between two adjacent first sampling points P1 is substantially equal to the distance w2 between two adjacent second sampling points P2, it indicates that the first sampling points P1 and the second sampling points P2 match the sampling rule. For convenience, this embodiment is not limited to be explained by the first sampling points P1 and the second sampling points P2. In practice, this embodiment may also contemplate performing a surface height measurement to more sampling points on the object 20, which respectively have a different distance with the rotating axis 103.

In addition, in an embodiment, as shown in FIG. 4, when the measuring module 14 obtains a plurality of third sampling points P3, a plurality of fourth sampling points P4 and a plurality of fifth sampling points P5 in at least a region Q on the surface of the object 20, the third distance d3 between the third sampling point P3 and the rotating axis 103 is shorter than the fourth distance d4 between the fourth sampling point P4 and the rotating axis 103, the fourth distance d4 is shorter than the fifth distance d5 between the fifth sampling point P5 and the rotating axis 103, and the difference f1 between the third distance d3 and the fourth distance d4 is substantially equal to the difference f2 between the fourth distance d4 and the fifth distance d5. Therefore, the third sampling points P3, the fourth sampling points P4 and the fifth sampling points P5 match the sampling rule.

In practice, when the measuring position of the measuring module 14 on the motion lever 121 is a preset position and the sampling frequency of the measuring module 14 arrives a preset frequency, the control module 16 will adjust the rotating speed of the rotation platform 10 instead of adjusting the sampling frequency of the measuring module 14. In other words, if the projection of the measuring module 14 onto the surface of the object 20 is located at the inner edge of the region R, the control module 16 will decrease the sampling frequency of the measuring module 14 as small as possible, and then, if the sampling points obtained in the inner edge of the region R by the measuring module 14 still can not match the sampling rule, the control module 16 will adjust the rotating speed of the rotation platform 10 instead of adjusting the sampling frequency of the measuring module 14, to make the sampling points in the inner edge of the region R match the sampling rule.

In another practical embodiment, the control module 16 can set the sampling frequency of the measuring module 14 to be a constant value, and the control module 16 adjusts the rotating speed of the rotation platform 10 according to which measuring position the measuring module 14 is located on the motion lever 121. In an example, when the projection of the measuring module 14 onto the surface to be measured of the object 20 has a shorter distance with the rotating axis 103 (i.e., the measuring position of the measuring module 14 on the motion lever 121 is closer to the rotating axis 103), the rotating speed of the rotation platform 10 will be higher; and when the projection of the measuring module 14 onto the surface to be measured of the object 20 has a longer distance with the rotating axis 103, the rotating speed of the rotation platform 10 will be lower so that the first sampling points P1 and the second sampling points P2 obtained in at least the region R of the surface of the object 20 by the measuring module 14 will match the sampling rule.

In this embodiment, the first sampling points P1 have a first distance d1 with the rotating axis 103, and the second sampling points P2 have a second distance d2 with the rotating axis 103. For example, the sampling rule for the first sampling points P1 and the second sampling points P2 is that the distance between two adjacent first sampling points P1 is substantially equal to the distance between two adjacent second sampling points P2.

In practice, when the measuring position of the measuring module 14 on the motion lever 121 is a preset position and the rotating speed of the rotation platform 10 arrives a preset speed, the control module 16 will adjust the sampling frequency of the measuring module 14 instead of adjusting the rotating speed of the rotation platform 10. For example, when the projection of the measuring module 14 onto the surface of the object 20 arrives the inner edge of the region R, the control module 16 will adjust the rotating speed of the rotation platform 10 as high as possible, and then when the sampling points of the measuring module 14 in the inner edge of the region R of the measuring module 14 still cannot match the sampling rule, the control module 16 will adjust the sampling frequency of the measuring module 14 instead of adjusting the rotating speed of the rotation platform 10, to make the sampling points in the inner edge of the region R match the sampling rule.

To sum up, to make the sampling points sampled on the surface of the object 20 by the measuring module 14 match the sampling rule, the exemplary control manners used by the control module 16 include: (1) adjusting the sampling frequency of the measuring module 14 according to the variable measuring position of the measuring module 14 when the rotating speed of the rotation platform 10 is set at a constant value; (2) adjusting the rotating speed of the rotation platform 10 according to the variable measuring position of the measuring module 14 when the sampling frequency of the measuring module 14 is set at a constant value; (3) adjusting the sampling frequency or the rotating speed that is constant previously, when the sampling frequency or the rotating speed arrives its preset limitation.

In an embodiment, the relationship between the rotating speed of the rotation platform 10 and the sampling frequency of the measuring module 14 is expressed as: $T=D/v=D/(2\pi r/t)$, wherein T represents a reciprocal of the sampling frequency of the measuring module 14, i.e. the sampling cycle of the measuring module 14, D represents the distance between two neighboring sampling points on the same circle, v represents the rotating speed of a mass point on the rotation platform 10, t represents the time for the rotation platform 10 to rotate one turn, and r represents a radius between a sampling point and the rotating axis 103. In other words, to mach sampling rule where two neighboring sampling points on the same circle have the same distance therebetween, D is a constant value. When the rotating speed of the rotation platform 10 is set at a constant, that is, the time t for the rotation platform 10 to rotate one turn is constant, and when the measuring position of the measuring module 14 shifts in a direction leaving the rotating axis 103, r will increase so that the sampling cycle of the measuring module 14 will decrease and the sampling frequency of the measuring module 14 will increase.

In another case of matching the sampling rule where two neighboring sampling points on the same circle have the same distance therebetween, when the sampling frequency of the measuring module 14 is set at a constant value (i.e. the sampling cycle T of the measuring module 14 is constant) and the measuring position of the measuring module 14 shifts in a direction leaving the rotating axis 103, r will increase so that the time t for the rotation platform 10 to rotate one turn will increase, that is, the rotating speed of the rotation platform 10 will slow down. The control module 16 can control the sampling points, sampled on the surface of the object 20 by the measuring module 14 for a height measurement, to match the sampling rule according to the relationship between the rotating speed of the rotation platform 10 and the sampling frequency of the measuring module 14, i.e. $T=D/v=D/(2\pi r/t)$.

In the foregoing embodiment, the control module 16 may adjust the sampling frequency of the measuring module 14 according to the measuring position of the measuring module 14 on the motion lever 121 under a constant rotating speed of the rotation platform 10, or may adjust the rotating speed of the rotation platform 10 according to the measuring position of the measuring module 14 on the motion lever 121 under a constant sampling frequency of the measuring module 14, so as to evenly sample the object to obtain the accurate surface state of the object. In other embodiments, a person of ordinary skill in the art can understand that the control module 16 can also simultaneously adjust the sampling frequency of the measuring module 14 and the rotating speed of the rotation platform 10 according to the measuring position of the measuring module 14 on the motion lever 121 to make the sampling points sampled in at least a region of the surface of the object 20 by the measuring module 14 match the above sampling rule, and there are no more related descriptions hereafter.

Figure 5:
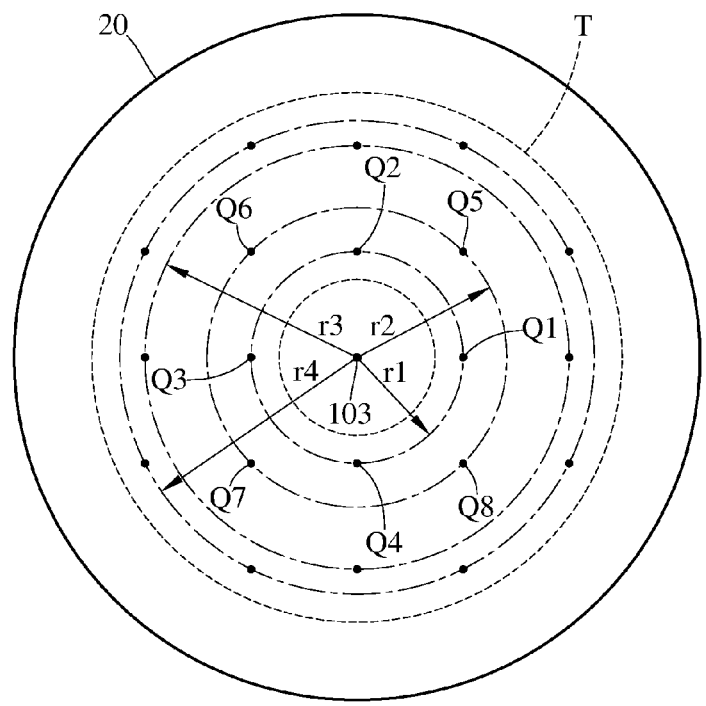
FIG. 5 is a schematic view of sampling points in at least a region of the object in the third embodiment of the disclosure.

Please refer to FIGS. 1, 2 and 5. FIG. 5 is a schematic view of sampling points in at least a region of the object in the third embodiment of the disclosure. As shown in the figures, in this embodiment, an example is used to illustrate that the control module 16 simultaneously adjusts the sampling frequency of the measuring module 14 and the rotating speed of the rotation platform 10 according to the measuring position of the measuring module 14 on the motion lever 121 to make sampling points selected in at least a region of the surface of the object 20 by the measuring module 14 match another sampling rule. The control module 16 controls the measuring module 14 to move along the motion lever 121 so that the projection of the measuring module 14 onto the surface of the object 20 sequentially stays at a first position, a second position, a third position and a fourth position. The distance between the first position and the rotating axis 103 is a first radius r1, the distance between the second position and the rotating axis 103 is a second radius r2, the distance between the third position and the rotating axis 103 is a third radius r3, and the distance between the fourth position and the rotating axis 103 is a fourth radius r4. The first radius r1 to the fourth radius r4 are defined by the positions of sampling points to be sampled predeterminedly.

In the embodiment shown in FIG. 5, sampling points in a region T are substantially arranged in a 5-order matrix form, wherein sampling points Q1~Q4 are located on a circle of a first radius r1 that has the rotating axis 103 as a center, sampling points Q5~Q8 are located on a circle of a second radius r2 that has the rotating axis 103 as a center, and it can be deduced by analogy that other sampling points are respectively located on a circle of a third radius r3 and of a fourth radius r4 having the rotating axis 103 as a center. When the measuring module 14 is located at the first position, the control module 16 will adjust the sampling frequency of the measuring module 14 and the rotating speed of the rotation platform 10 according to the positions of preset sampling points so that the measuring module 14 can respectively perform a surface height measurement onto the sampling points Q1~Q4. When the measuring module 14 is located at the second position, the control module 16 will adjust the sampling frequency of the measuring module 14 and the rotating speed of the rotation platform 10 according to the positions of preset sampling points so that the measuring module 14 can respectively perform a surface height measurement onto the sampling points Q5~Q8. It can be deduced by analogy that when the measuring module 14 is located at the third position or the fourth position, the sampling frequency of the measuring module 14 and the rotating speed of the rotation platform 10 will be adjusted according to the positions of preset sampling points so that the measuring module 14 can respectively perform a surface height measurement onto the other preset sampling points in the region T.

Therefore, each sampling point in at least the region T on the surface of the object 20 has the same distance with its neighboring sampling points and thus, matches the sampling rule. That is, while the control module 16 adjusts the sampling frequency of the measuring module 14 and the rotating speed of the rotation platform 10 according to the sampling rule, the measuring module 14 can evenly object the object 20 and thus, accurately obtain the surface state of the object.

In this embodiment, the control module 16 simultaneously adjusts the sampling frequency of the measuring module 14 and the rotating speed of the rotation platform 10 to make the distances between the sampling points in at least the region T on the surface of the object 20 are substantially equal to each other. In other embodiments, the control module may set either the sampling frequency of the measuring module 14 or the rotating speed of the rotation platform 10 at a constant value but adjust the other one to make each sampling point have the same distance with its neighboring sampling points in at least the region T on the surface of the object 20.

Figure 6A:
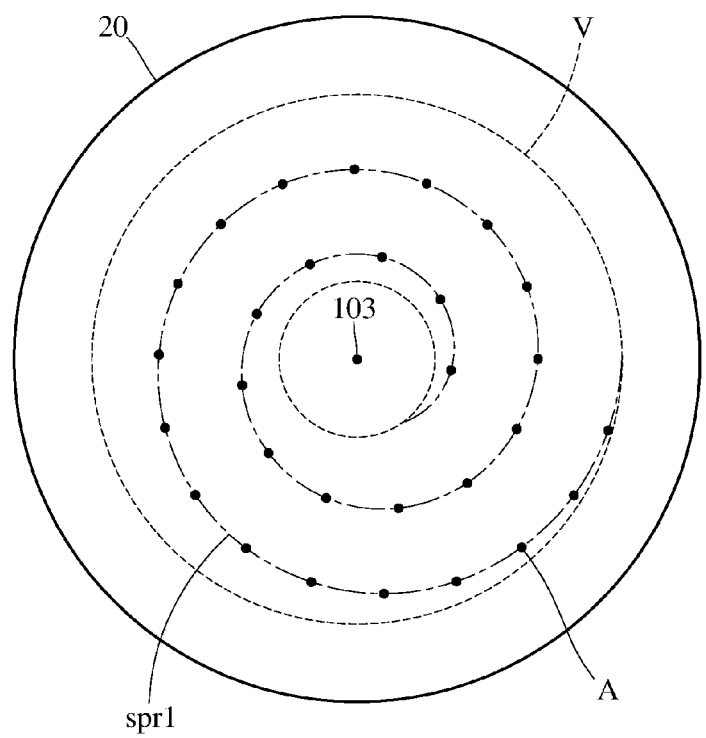
FIG. 6A is a schematic view of sampling points in at least a region of the object in the fourth embodiment of the disclosure.
Figure 6B:
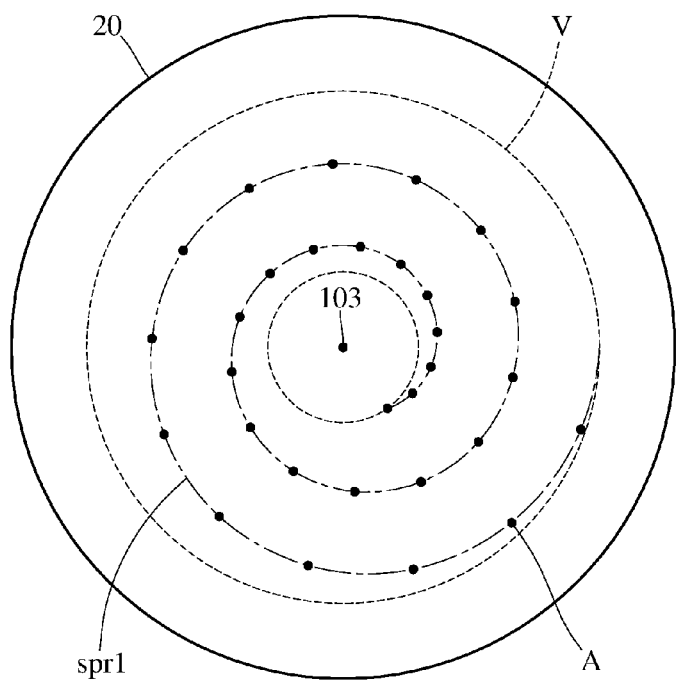
FIG. 6B is a schematic view of sampling points in at least a region of the object in the fifth embodiment of the disclosure.

Please refer to FIGS. 1, 2, 6A and 6B. FIG. 6A is a schematic view of sampling points in at least a region of the object in the fourth embodiment of the disclosure, and FIG. 6B is a schematic view of sampling points in at least a region of the object in the fifth embodiment of the disclosure. As shown in the figures, in this embodiment, while sampling on the surface of the object 20, the measuring module 14 moves from the measuring position, far from the rotating axis 103, to the measuring position, close to the rotating axis 103, on the motion lever 121. In other words, the measuring module 14 moves from the outer edge of a region V to the inner edge of the region V as the rotation platform 10 is rotating, to make the sampling points A match another sampling rule where the sampling points A are arranged along a spiral line Spr1 in the region V. In an embodiment, the spiral line Spr1 has a center, the rotating axis 103, and the winds of the spiral line Spr1 are not limited to have the same distance therebetween. In other embodiments, a regulation line along which the sampling points A are arranged is a spiral line that surrounds the rotating axis 103 as its center and has windings distributed convergently or divergently in a direction from the rotating axis 103 to the outer edge of the region V. For convenience, the following description is based on the case where the winds of the spiral line Spr1 have the same distance therebetween, and this embodiment is not limited thereto.

In an embodiment, the control module 16 sets the rotating speed of the rotation platform 10 at a constant value, and the measuring module 14 moves in a constant speed from a measuring position, far from the rotating axis 103, to a measuring position, close to the rotating axis 103, on the motion lever 121, and thus, the sampling path of the measuring module 14 on the surface of the object 20 is the spiral line Spr1 surrounding the rotating axis 103 as a center and having winds having the same distance therebetween.

The control module 16 adjusts the sampling frequency of the measuring module 14 according to the measuring position of the measuring module 14 on the motion lever 121 to make the sampling points on the spiral line Spr1 match actual measurement requirements. For example, the control module 16 sets the sampling frequency of the measuring module 14 at a constant value so that every two sequential sampling points on the spiral line Spr1 sampled by the measuring module 14 has the same distance therebetween, as shown in FIG. 6A. The control module 16 controls the distance between every two sequential sampling points on the spiral line Spr1 by adjusting the sampling frequency of the measuring module 14. In another example, as shown in FIG. 6B, when the measuring module 14 is located at a measuring position far from the rotating axis 103, the control module 16 will increase the sampling frequency of the measuring module 14; and when the measuring module 14 is located at a measuring position close to the rotating axis 103, the control module 16 will reduce the sampling frequency of the measuring module 14 so that the distance between two sequential sampling points close to the rotating axis 103 is shorter than the distance between two sequential sampling points far from the rotating axis 103, and vice versa. This embodiment is not limited to this.

For convenience, this embodiment defines that the rotating speed of the rotation platform 10 and the speed of the measuring module 14 moving on the motion lever 121 are constant. In other embodiments, the control module 16 may control the rotating speed of the rotation platform 10 and the speed of the measuring module 14 moving on the motion lever 121 so that the sampling path of the measuring module 14 on the surface of the object 20 is not limited to be the spiral line Spr1.

Figure 7A:
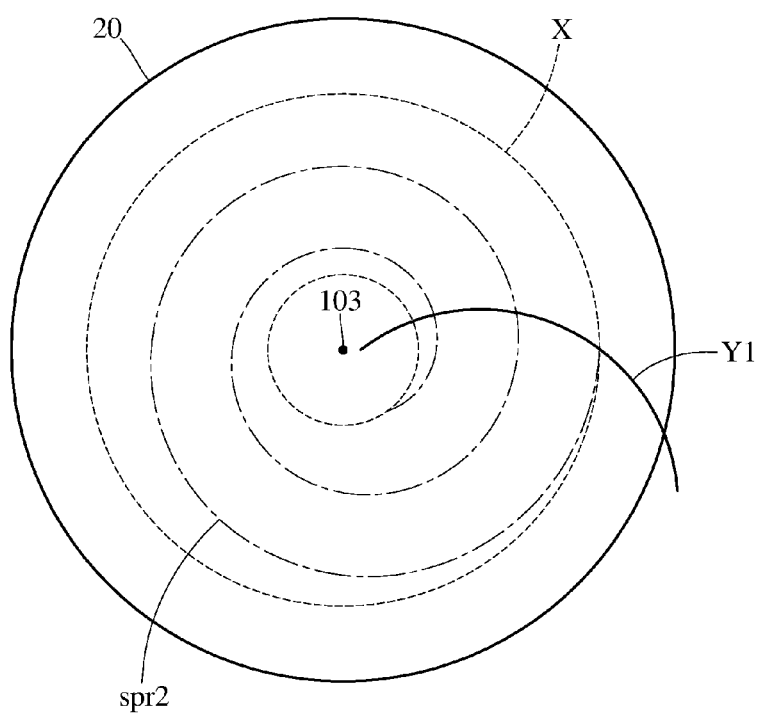
FIG. 7A is a schematic view of sampling points in at least a region of the object in the sixth embodiment of the disclosure.
Figure 7B:
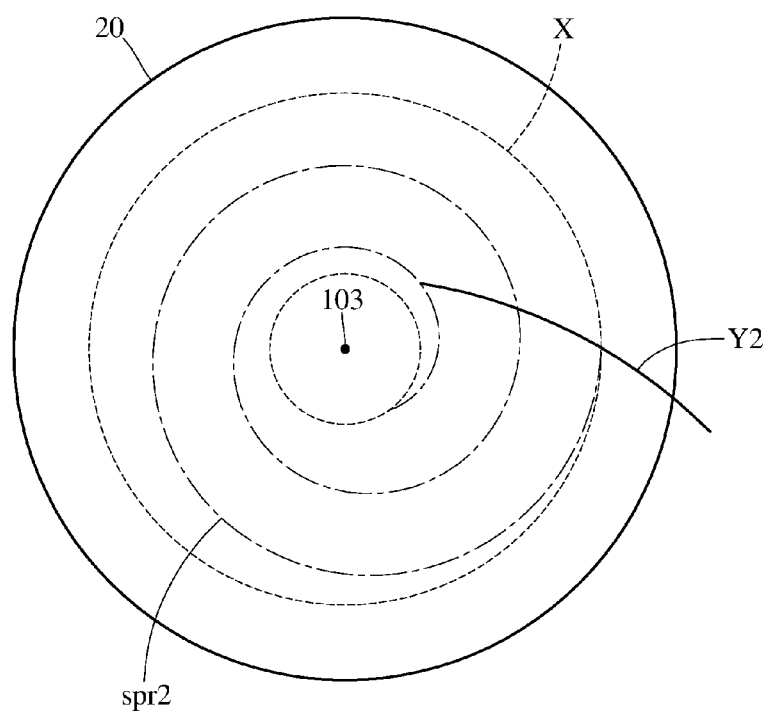
FIG. 7B is a schematic view of sampling points in at least a region of the object in the seventh embodiment of the disclosure.

In another embodiment, in addition to the rotating speed of the rotation platform 10 and the speed of the measuring module 14 moving on the motion lever 121, the control module 16 may further control the moving mechanism 12 to move the motion lever 121 relative to the rotation platform 10 so that the sampling path of the measuring module 14 on the surface of the object 20 is a spiral line. Please refer to FIGS. 1, 2, 7A and 7B. FIG. 7A is a schematic view of sampling points in at least a region of the object in the sixth embodiment of the disclosure, and FIG. 7B is a schematic view of sampling points in at least a region of the object in the seventh embodiment of the disclosure. As shown in the figures, in this embodiment, the control module 16 controls the motion lever 121 to move relative to the rotation platform 10 and controls the measuring module 14 to move from the outer edge of a region X to the inner edge of region X in a variable speed so that the projection of the measuring module 14 onto the surface of the object 20 moves along a path Y1, as shown in FIG. 7A. When the control module 16 sets that the rotation platform 10 is rotated in a constant speed, the sampling points sampled in a part of the region X on the surface of the object 20 by the measuring module 14 are arranged along a spiral line Spr2. In FIG. 7B, the control module 16 controls the measuring module 14 to move from the outer edge of the region X to the inner edge of the region X in a constant speed such that the projection of the measuring module 14 on the surface of the object 20 moves along a path Y2, as shown in FIG. 7B.

Likewise, the control module 16 adjusts the sampling frequency of the measuring module 14 according to the measuring position of the measuring module 14 on the motion lever 121 to make the sampling points on the spiral line Spr2 match actual measurement requirements. For example, the control module 16 sets the sampling frequency of the measuring module 14 at a constant value to equalize the distance between every two sequential sampling points on the spiral line Spr2 sampled by the measuring module 14. The control module 16 controls the distance between two sequential sampling points on the spiral line Spr2 by adjusting the sampling frequency of the measuring module 14. In another example, as shown in FIG. 7B, when the measuring module 14 is located at a measuring position far from the rotating axis 103, the control module 16 will increase the sampling frequency of the measuring module 14; and when the measuring module 14 is located at a measuring position close to the rotating axis 103, the control module 16 will reduce the sampling frequency of the measuring module 14 such that the distance between two sequential sampling points closer to the rotating axis 103 is shorter than the distance between two sequential sampling points far from the rotating axis 103, and vise versa. This embodiment is not limited to this.

In this embodiment, the spiral line Spr2 surrounds the rotating axis 103 as a center, and the winds of the spiral line Spr2 have the same distance therebetween. This embodiment is not limited to this. In other embodiments, a regulation line, along which sampling points are arranged, as a spiral line surrounds the rotating axis 103 as a center, and the windings of the regulation line are distributed divergently or convergently in a direction from the rotating axis 103 to the outer edge of the region X. A person of ordinary skill in the art can, according to actual requirements, design that the control module 16 controls the movement of the motion lever 121, the rotating speed of the rotation platform 10, the speed of the measuring module 14 moving on the motion lever 121, and this embodiment is not limited thereto. Even if the sampling path of the measuring module 14 on the surface of the object 20 is a spiral line having different pitches between the windings, the control module 16 can still adjust the sampling frequency of the measuring module 14 according to the measuring position of the measuring module 14 on the motion lever 121 to make the sampling points on the spiral line Spr2 match actual measurement requirements, and there is no more related description hereafter.

Figure 8:
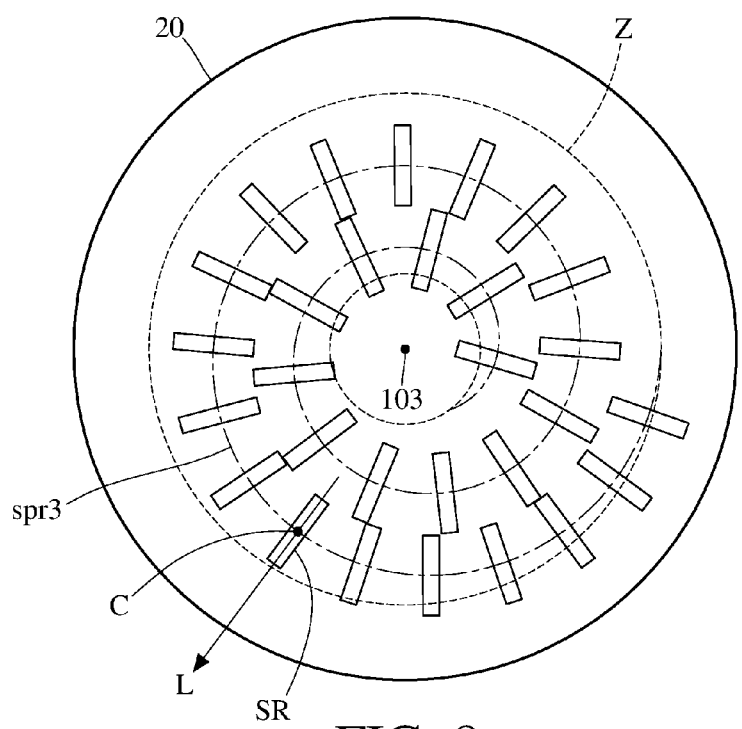
FIG. 8 is a schematic view of sampling points in at least a region of the object in the eighth embodiment of the disclosure.

In an embodiment, please refer to FIGS. 1, 2 and 8. FIG. 8 is a schematic view of sampling points in at least a region of the object in the eighth embodiment of the disclosure. As shown in the figures, the measuring module 14 objects the surface of the object 20 every time by providing a plurality of measuring signals onto the surface of the object 20. For example, the measuring module 14 projects a plurality of light beams onto a sampling region SR on the surface of the object 20. These light beams are used to respectively object points in the sampling region SR, these points to be sampled constitute the sampling region SR, and the light beams are not limited to be arranged in a matrix form or parallel to each other. In the embodiment shown in the figure, a plurality of measuring signals are arranged parallel to each other in a direction L that is vertical to the tangent direction of the spiral line Spr3, and a plurality of sampling regions SR is arranged along the spiral line Spr3 surrounding the center C. In an embodiment, the sampling regions SR are related to the sampling points in the previous embodiments, and for example, the center C of each sampling region SR has the same position as the position of one of the sampling points in the previous embodiments. In other words, the control module 16 adjusts the sampling frequency of the measuring module 14 according to the measuring position of the measuring module 14 on the motion lever 121 to make the sampling regions on the spiral line Spr3 match actual measurement requirements, such as making two sequential sampling regions on the spiral line Spr3 have the same distance or a different distance therebetween, or making two sequential sampling regions close to the rotating axis 103 have a distance therebetween shorter or longer than the distance between two sequential sampling regions far from the rotating axis 103, and this embodiment is not limited thereto.

Figure 9:
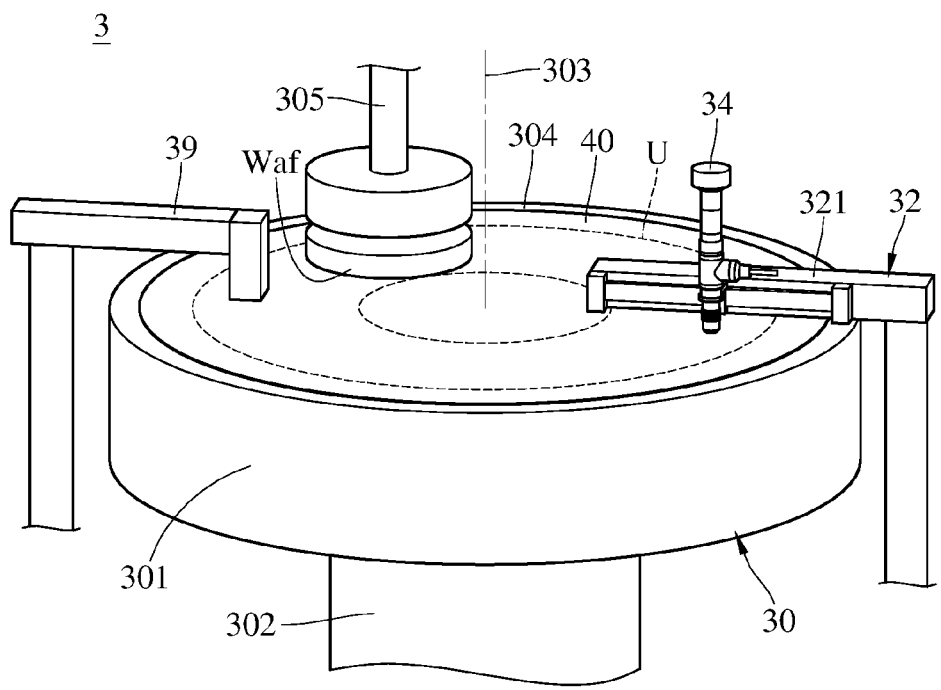
FIG. 9 is a schematic view of a surface measurement device in another embodiment of the disclosure.
Figure 10:
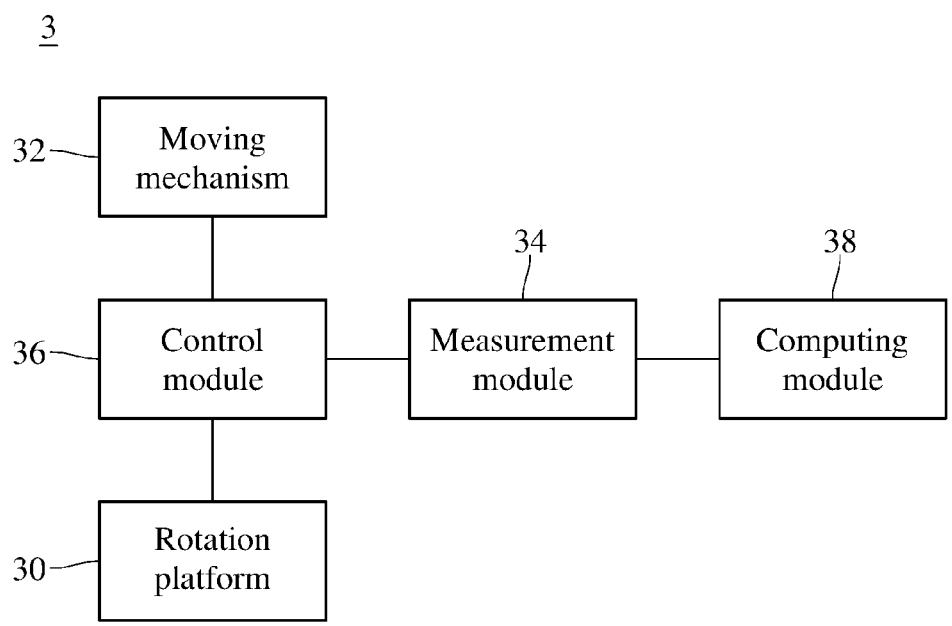
FIG. 10 is a block diagram of the surface measurement device in another embodiment of the disclosure.
Figure 11:
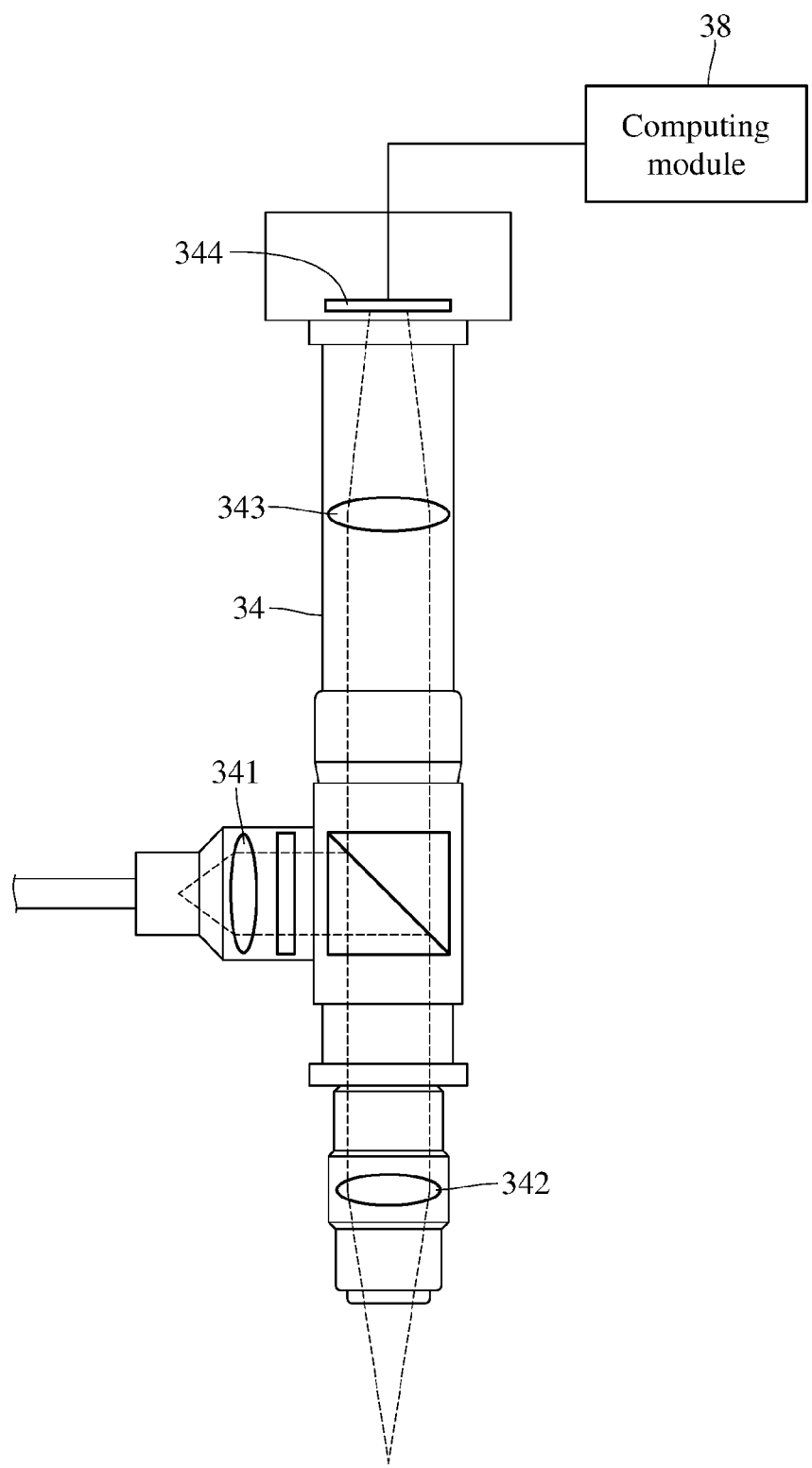
FIG. 11 is a schematic view of the measuring module in an embodiment of the disclosure.
Figure 12:
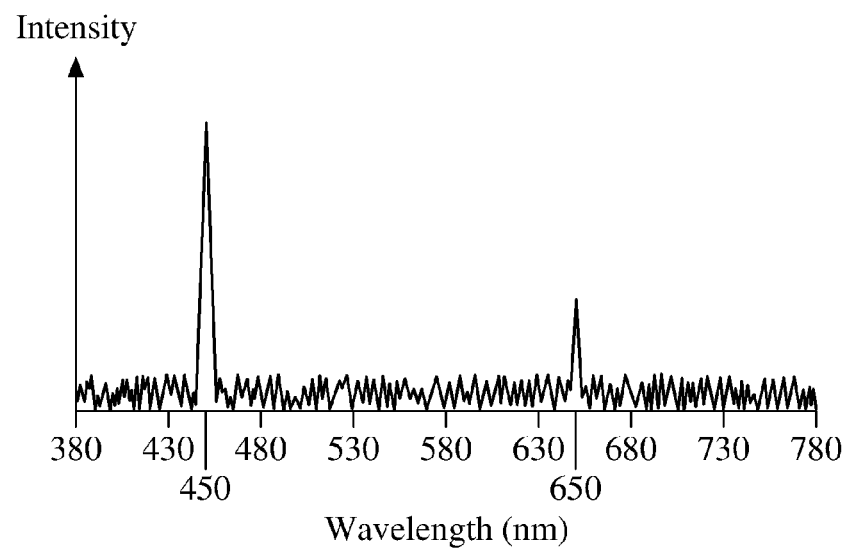
FIG. 12 is a wavelength distribution diagram of the reflected light beam in an embodiment of the disclosure.

Please refer to FIG. 9 to FIG. 12. FIG. 9 is a schematic view of a surface measurement device in another embodiment of the disclosure, FIG. 10 is a block diagram of the surface measurement device in another embodiment of the disclosure, FIG. 11 is a schematic view of the measuring module in an embodiment of the disclosure, and FIG. 12 is a wavelength distribution diagram of the reflected light beam in an embodiment of the disclosure. As shown in the figures, a surface measurement device 3 includes a rotation platform 30, a moving mechanism 32, a measuring module 34, a control module 36, a computing module 38 and a slurry pipe 39. The rotation platform 30 includes a carrying platform 301, a rotating shaft 302 and a polishing head 305. The carrying platform 301 is disposed on the rotating shaft 302 and is rotated about a rotating axis 303. The carrying platform 301 includes a bearing surface 304 for disposing the polishing pad 40 so that the polishing head 305 can press a wafer Waf against the polishing pad 40. When the polishing head 305 presses the wafer Waf to make it contact the polishing pad 40, the rotation platform 30 will rotate the polishing pad 40 and the polishing head 305 will rotate the wafer Waf relative to the polishing pad 40 so that the polishing pad 40 can smooth the surface of the wafer Waf. The slurry pipe 39 provides slurry to the surface of the wafer Waf during smoothing.

In an embodiment, on the top surface of the polishing pad 40 a work region U is defined by a region between boundaries respectively having a first distance and a second distance with the rotating axis 303, so that the polishing pad 40 smoothes the wafer Waf via its work region U. While the wafer Waf is being smoothed, the measuring module 34 will selectively perform a surface height measurement onto sampling points in the work region U of the polishing pad 40. In this embodiment, the extension direction of a motion lever 321 is not limited to be parallel to the bearing surface 304 or the radial direction of the polishing pad 40. That is, the motion lever 321 may have any extension direction, only if the projection of the motion lever onto the bearing surface 304 or the surface of the polishing pad 40 at least extends from a position having a first distance with the rotating axis 303 to a position having a second distance with the rotating axis 303.

The measuring module 34 is disposed on the motion lever 321 and is movable to a plurality of measuring positions on the motion lever 321. When the measuring module 34 is located at a measuring position, the measuring module 34 will select a plurality of sampling points on the surface of the polishing pad 40 in a sampling frequency to perform a surface height measurement onto the sampling points. Specifically, the measuring module 34 projects a plurality of light beams with difference wavelengths to measure a sampling point. When the sampling point reflects a light beam to the measuring module 34, the computing module 38 will calculate the surface height of the sampling point according to the wavelength of the reflected light beam.

For example, the measuring module 34 includes an input lens 341, an incident lens 342, an output lens 343 and a photodetector 344. Since there is a water film at a sampling point on the surface of the polishing pad 40, a light beam with wavelengths 380 nm-780 nm is respectively reflected by the water film and the polishing pad 40 when this light beam is projected onto the water film and the surface of the polishing pad 40 after traveling though sequentially the input lens 341 and the incident lens 342 of the measuring module 34. Then, the output lens 343 of the measuring module 34 focuses first reflected light reflected by the water film and second reflected light reflected by the polishing pad 40 on the photodetector 344 so that the photodetector 344 can sense the wavelength of the first reflected light and the wavelength of the second reflected light. For example, the first wavelength of the first reflected light is 450 nm, and the second wavelength of the second reflected light is 650 nm.

The computing module 38 is electrically connected to the photodetector 344 so that the computing module 38 can estimate the height of the water film and the height of the surface of the polishing pad 40 on a sampling point according to the first wavelength of the first reflected light and the second wavelength of the second reflected light. Then, the computing module 38 calculates the difference between the height of the water film and the height of the surface of the polishing pad 40 and corrects the height of the surface of the polishing pad 40 according to the difference between the height of the water film and the height of the surface of the polishing pad 40 and the refractive index of the water film to obtain a correct height of the surface of the polishing pad 40. When the measuring module 34 obtains surface heights of the sampling points in the work region U of the surface of the polishing pad 40, which are selected according to the foregoing sampling rule, the computing module 38 will obtain the surface roughness of the polishing pad 40 according to the surface height of each sampling point. Therefore, technical personnel can determine whether to replace the polishing pad 40 according to the surface roughness of the polishing pad 40. In this embodiment, the measuring module 34 only measures the surface roughness in the work region U; and, in other embodiments, the measuring module is not limited to measure the surface roughness of the entire polishing pad 40.

In addition, in an embodiment, the measuring module 34 further includes a gas injection component for performing a surface clean onto a sampling point when the measuring module 34 tries to project light onto the sampling point for measurement. For example, the gas injection component cleans off particles or the water film at the sampling point on the surface. A person of ordinary skill in the art can understand that if the measuring module 34 is disposed with a gas injection component for performing a surface clean onto a sampling point in advance, or if there is no water film at a sampling point which the measuring module 34 tries to measure, the computing module 38 will not obtain any information about light beam reflected from the water film or a particle and thus, may not perform the step of correcting the measurement result of the surface height of the polishing pad 40.

Figure 13:
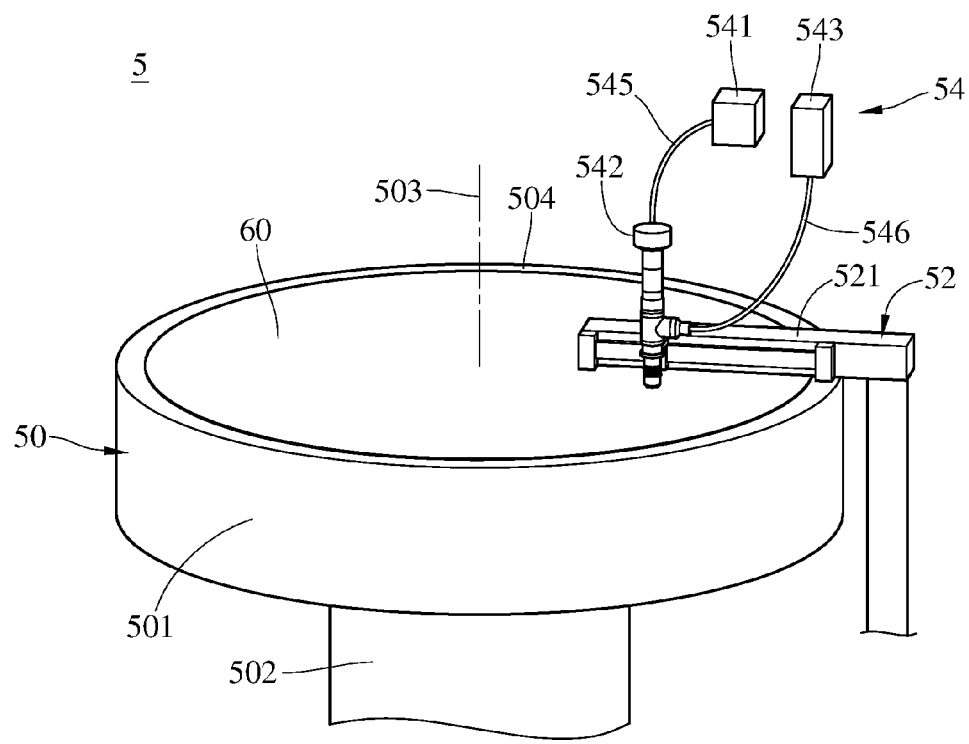
FIG. 13 is a schematic view of a surface measurement device in yet another embodiment of the disclosure.
Figure 14:
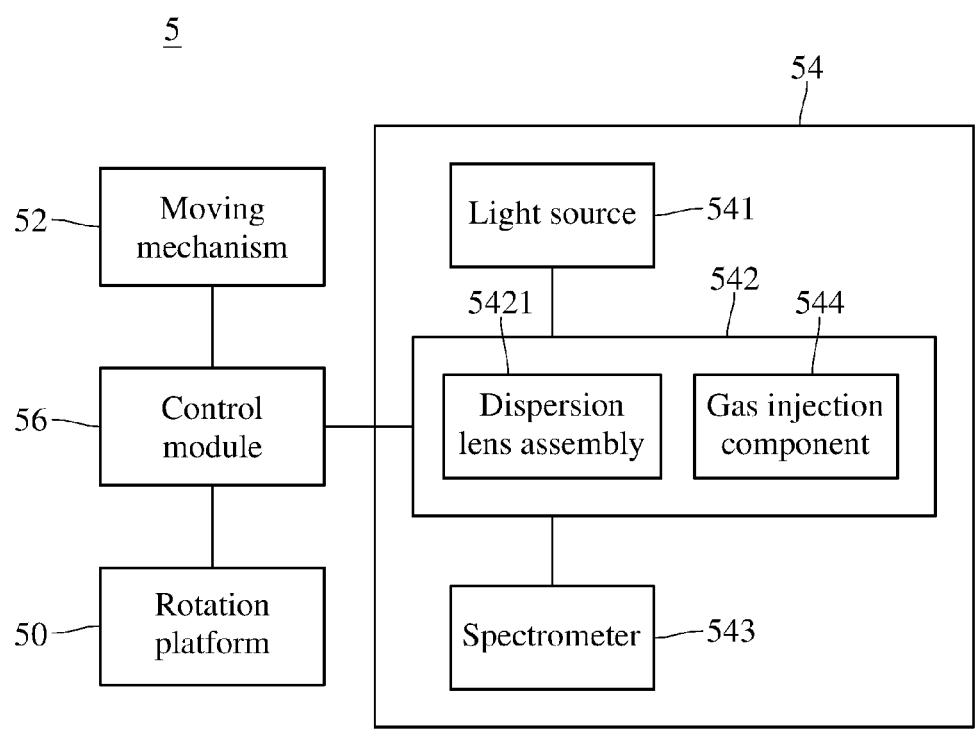
FIG. 14 is a block diagram of the surface measurement device in yet another embodiment of the disclosure.

Please refer to FIG. 13 and FIG. 14. FIG. 13 is a schematic view of a surface measurement device in yet another embodiment of the disclosure, and FIG. 14 is a block diagram of the surface measurement device in yet another embodiment of the disclosure. As shown in the figures, a surface measurement device 5 includes a rotation platform 50, a moving mechanism 52, a measuring module 54 and a control module 56. The rotation platform 50 is disposed with an object 60, and the rotation platform 50 rotates an object 60 at a rotating speed. In a particular example, the rotation platform 50 includes a carrying platform 501 and a rotating shaft 502. The carrying platform 501 is disposed on the rotating shaft 502 and is rotated about the rotating axis 503. The carrying platform 501 includes a bearing surface 504, and the object 60 is disposed on the bearing surface 504 of the carrying platform 501. The surface to be measured of the object 60 faces the measuring module 54. For example, the object 60 is a polishing pad, a SiC substrate, a GaN substrate or other suitable elements.

The moving mechanism 52 includes a motion lever 521. The motion lever 521 is located above the rotation platform 50, and the extension direction of the motion lever 521 is vertical to the normal line of the bearing surface 504. Therefore, the measuring module 54 can be movable on the extension direction of the motion lever 521 to perform a surface height measurement onto a surface to be measured of the object 60. Particularly, the measuring module 54 includes a light source 541, a projecting lens 542, a spectrometer 543 and a gas injection component 544. The projecting lens 542 of the measuring module 54 is movable on the extension direction of the motion lever 521, and the light source 541, the spectrometer 543 and the gas injection component 544 are not limited to be movable on the motion lever 521 or not.

The light source 541 of the measuring module 54 provides a measuring light beam, and the measuring light beam is transmitted through an input fiber cable 545 to the projecting lens 542. The projecting lens 542 is movable toward a plurality of measuring positions on the motion lever 521 and includes a dispersion lens assembly 5421. The light source 541 projects a measuring light beam in a sampling frequency to a plurality of sampling points on the surface of the object 60 through the dispersion lens assembly 5421. The light source 541 and the dispersion lens assembly 5421 are not limited to measure the surface to be measured of the object 60 by the chromatic confocal technology, the confocal laser technology or other suitable technologies, for example. In the case of the chromatic confocal technology, the measuring light beam outputted by the light source 541 is light with different wavelengths, and this light is focused on a point and then is projected to a variety of sampling points on the surface of the object 60 while passing through the dispersion lens assembly 5421, so that the sampling points of different heights will respectively reflect this light for the measurement of the surface height of each sampling point.

The spectrometer 543 is connected to the projecting lens 542 via an output fiber cable 546. The spectrometer 543 can receive, from the projecting lens 542, light reflected by a sampling point, and determine a wavelength intensity distribution according to the reflected light. The wavelength intensity distribution is related to the surface height of a sampling point. The gas injection component 544 is not limited to, for example, be disposed in the projecting lens 542. The gas injection component 544 and the dispersion lens assembly 5421 are movable toward a plurality of measuring positions on the motion lever 521. When the dispersion lens assembly 5421 projects a measuring light beam to a sampling point, the gas injection component 544 will jet gas to a sampling point to which the dispersion lens assembly 5421 projects light, so as to clean the surface at the sampling point, e.g. clean off particles or a water film. Optionally, the gas injection component 544 is not limited to be disposed outside the projecting lens 542, on the motion lever 521 or other suitable positions, only if the gas injection component 544 can jet gas to a sampling point, to which the dispersion lens assembly 5421 projects a measuring light beam.

The control module 56 is electrically connected to the rotation platform 50, the moving mechanism 52 and a measuring module 54. The control module 56 controls the dispersion lens assembly 5421 to move to a measuring position on the motion lever 521, controls the motion speed of the dispersion lens assembly 5421, and selectively adjusts the rotating speed of the rotation platform 50 or the sampling frequency, in which the light source 541 projects a measuring light beam through the dispersion lens assembly 5421, according to the measuring position of the projecting lens 542 on the motion lever 521 to make the distance between sampling points in at least a region of the surface of the object 60 match a sampling rule.

In an embodiment, for the light source 541, projecting a measuring light beam in the sampling frequency though the dispersion lens assembly 5421 is, for example, providing the measuring light beam to the dispersion lens assembly 5421 in the sampling frequency, or continuously providing the measuring light beam to the dispersion lens assembly 5421 before the dispersion lens assembly 5421 projects the measuring light beam to the surface of the object 60 in the sampling frequency; and however, this embodiment is not limited thereto. For an illustrative purpose, the following description is based on an exemplary case where the dispersion lens assembly 5421 projects a measuring light beam to the surface of the object 60 in a sampling frequency; and a person of ordinary skill in the art can understand in view of the embodiments below how the light source 541 provides a measuring light beam to the dispersion lens assembly 5421 in a sampling frequency, and there is no more related descriptions hereafter.

For the control module 56, selectively adjusting the rotating speed or the sampling frequency according to the measuring position of the projecting lens 542 on the motion lever 521 may be adjusting the sampling frequency of the dispersion lens assembly 5421 according to the measuring position of the projecting lens 542 on the motion lever 521 as the rotating speed of the rotation platform 50 is fixed, or be adjusting the rotating speed of the rotation platform 50 according to the measuring position of the projecting lens 542 on the motion lever 521 as the sampling frequency of the dispersion lens assembly 5421 is fixed, or be simultaneously adjusting the rotating speed of the rotation platform 50 and the sampling frequency of the dispersion lens assembly 5421 according to the measuring position of the projecting lens 542 on the motion lever 521; and these examples will be explained in detail later. Moreover, the sampling rule may be that a sampling point has the same distance with its most neighboring sampling points, or that any two neighboring sampling points in a region of the same radius have the same distance therebetween, or that all sampling points are arranged along a spiral line that sets the rotating axis of the rotation platform 50 as a center; and embodiments of the sampling rule will be explained by written words in cooperation with drawings.

Figure 15:
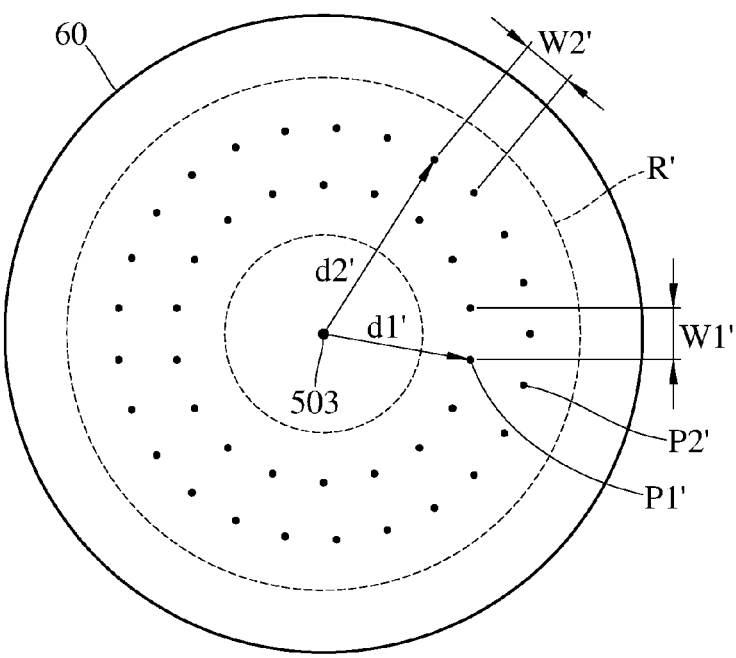
FIG. 15 is a schematic view of sampling points in at least a region of the object in the ninth embodiment of the disclosure.

First, please refer to FIG. 13 to FIG. 15. FIG. 15 is a schematic view of sampling points in at least a region of the object in the ninth embodiment of the disclosure. As shown in the figure, in this embodiment, a sampling rule applied to the object 60 by the dispersion lens assembly 5421 is: a plurality of first sampling points P1' is arranged on a circle of a radius of d1', a center of which is the rotating axis 103; a plurality of second sampling points P2' is arranged on a circle of a radius of d2', a center of which is the rotating axis 103; and the distance W1' between any two neighboring first sampling points P1' is substantially equal to the distance W2' between any two neighboring second sampling points P2'.

To assure that sampling points on the object 60 measured by the dispersion lens assembly 5421 match such a sampling rule, the control module 56 adjusts the sampling frequency of the dispersion lens assembly 5421 according to the measuring position of the dispersion lens assembly 5421 on the motion lever 521 as setting the rotating speed of the rotation platform 50 at a constant value. For example, when the measuring position of the dispersion lens assembly 5421 on the motion lever 521 is closer the rotating axis 503, the control module 56 will reduce the sampling frequency of the dispersion lens assembly 5421. That is, when the projection of the dispersion lens assembly 5421 onto a surface to be measured of the object 60 has a shorter distance with the rotating axis 503, the sampling frequency of the dispersion lens assembly 5421 will become smaller; and when the projection of the dispersion lens assembly 5421 onto the surface to be measured of the object 60 has a longer distance with the rotating axis 503, the sampling frequency of the dispersion lens assembly 5421 will become larger so that the first sampling points P1 and the second sampling points P2 in at least the region R' of the surface of the object 60 sampled by the dispersion lens assembly 5421 match the sampling rule. For example, as shown in the figure, the first sampling points P1 and the second sampling points P2 in at least the region R on the surface of the object 60 match the sampling rule.

For an illustrative purpose, this embodiment is explained by first sampling points P1 and second sampling points P21 and however, in practice, the sampling rule is not limited to permit more sampling points to be arranged on a variety of circles of different radiuses, a center of which is the rotating axis 503. Moreover, in an embodiment, the sampling rule further requires that the difference between the radiuses of any two neighboring circles having the rotating axis 503 as a center is the same.

In practice, when the measuring position of the dispersion lens assembly 5421 on the motion lever 521 is a preset position and the sampling frequency of the dispersion lens assembly 5421 arrives a preset frequency, the control module 56 will adjust the rotating speed of the rotation platform 50 instead of adjusting the sampling frequency of the dispersion lens assembly 5421. That is, as an example, when the projection of the dispersion lens assembly 5421 onto the surface of the object 60 has arrived at the inner edge of the region R', the control module 56 would adjust the sampling frequency of the dispersion lens assembly 5421 to be small as possible; and herein if the sampling points on the inner edge of the region R' selected for the dispersion lens assembly 5421 cannot match the sampling rule yet, the control module 56 will adjust the rotating speed of the rotation platform 50 instead of adjusting the sampling frequency of the dispersion lens assembly 5421 to make the sampling points on the inner edge of the region R' match the sampling rule.

For this sampling rule, the control module 56 may set the sampling frequency of the dispersion lens assembly 5421 at a constant value instead of setting the rotating speed of the rotation platform 50 at a constant value, and the control module 56 adjusts the rotating speed of the rotation platform 50 according to the measuring position of the dispersion lens assembly 5421 on the motion lever 521. For example, when the projection of the dispersion lens assembly 5421 onto the surface to be measured of the object 60 has a shorter distance with the rotating axis 503 (i.e. the measuring position of the dispersion lens assembly 5421 on the motion lever 521 is closer to the rotating axis 503), the rotating speed of the rotation platform 50 will become higher. When the projection of the dispersion lens assembly 5421 onto the surface to be measured of the object 60 has a longer distance with the rotating axis 503, the rotating speed of the rotation platform 50 will become lower to make the first sampling points P1' and the second sampling points P2' sampled in the region R' by the dispersion lens assembly 5421 match the sampling rule.

Similarly, in practice, when the measuring position of the dispersion lens assembly 5421 on the motion lever 521 arrives a preset position and the rotating speed of the rotation platform 50 arrives a preset speed, the control module 56 will adjust the sampling frequency of the dispersion lens assembly 5421 instead of adjusting the rotating speed of the rotation platform 50. That is, as an example, when the projection of the dispersion lens assembly 5421 onto the surface of the object 60 has arrived at the inner edge of the region R', the control module 56 will adjust the rotating speed of the rotation platform 50 as high as possible; and herein, if the sampling points on the inner edge of the region R' sampled by the dispersion lens assembly 5421 cannot match the sampling rule, the control module 56 will adjust the sampling frequency of the dispersion lens assembly 5421 instead of adjusting the rotating speed of the rotation platform 50 to make the sampling points on the inner edge of the region R' match the sampling rule.

To sum up, exemplary manners, used by the control module 56 to make the sampling points on the surface of the object 60 sampled by the dispersion lens assembly 5421 match a sampling rule, include: (1) adjusting the sampling frequency of the dispersion lens assembly 5421 according to the measuring position of the dispersion lens assembly 5421 as the rotating speed of the rotation platform 50 is set at a constant value; (2) adjusting the rotating speed of the rotation platform 50 according to the measuring position of the dispersion lens assembly 5421 as the sampling frequency of the dispersion lens assembly 5421 is set at a constant value; and (3) adjusting the sampling frequency or the rotating speed that is constant previously when the sampling frequency or the rotating speed arrives its preset limitation.

In an embodiment, the relationship between the rotating speed of the rotation platform 10 and the sampling frequency of the dispersion lens assembly 5421 is expressed as: $T=D/v=D/(2\pi r/t)$, wherein T represents a reciprocal of the sampling frequency of the dispersion lens assembly 5421, i.e. the sampling cycle of the dispersion lens assembly 5421, D represents the distance between two neighboring sampling points on the same circle, v represents the rotating speed of a mass point on the rotation platform 50, t represents the time that the rotation platform 50 rotates one turn, and r represents a radius from a sampling point to the rotating axis 503. In other words, to match the sampling rule where two neighboring sampling points on the same circle has the same distance therebetween, D is a constant value. When the rotating speed of the rotation platform 50 is set at a constant value (i.e. the time t that the rotation platform 50 rotates one turn is a constant) and the measuring position of the dispersion lens assembly 5421 shifts in a direction leaving the rotating axis 503, r will increase so that the sampling cycle of the dispersion lens assembly 5421 will decrease, that is, the sampling frequency of the dispersion lens assembly 5421 will increase. When the sampling frequency of the dispersion lens assembly 5421 is set at a constant value (i.e. the sampling cycle T of the dispersion lens assembly 54214 is a constant value) and the measuring position of the dispersion lens assembly 5421 shifts in a direction leaving the rotating axis 503, r will increase so that the time t for the rotation platform 50 to rotate one turn will increase, that is, the rotating speed of the rotation platform 50 will slow down. The control module 56 can control the sampling points on the surface of the object 60, onto which the dispersion lens assembly 5421 performs a height measurement, to mach the sampling rule according to the relationship between the rotating speed of the rotation platform 50 and the sampling frequency of the dispersion lens assembly 5421, e.g. $T=D/v=D/(2\pi r/t)$.

In the foregoing embodiment, the control module 56 may adjust the sampling frequency of the measuring module 54 according to the measuring position of the dispersion lens assembly 5421 on the motion lever 521 while the rotating speed of the rotation platform 50 is constant, or may adjust the rotating speed of the rotation platform 50 according to the measuring position of the measuring module 54 on the motion lever 521 while the sampling frequency of the measuring module 54 is constant, in order to evenly sample the object to obtain the accurate surface status of the object. In other embodiments, a person of ordinary skill in the related art can understand that the control module 56 may simultaneously adjust the sampling frequency of the dispersion lens assembly 5421 and the rotating speed of the rotation platform 50 according to the measuring position of the dispersion lens assembly 5421 on the motion lever 521 to make the sampling points sampled in at least a region in the surface of the object 60 by the dispersion lens assembly 5421 match the foregoing sampling rule, and there are no more related descriptions hereafter.

Figure 16:
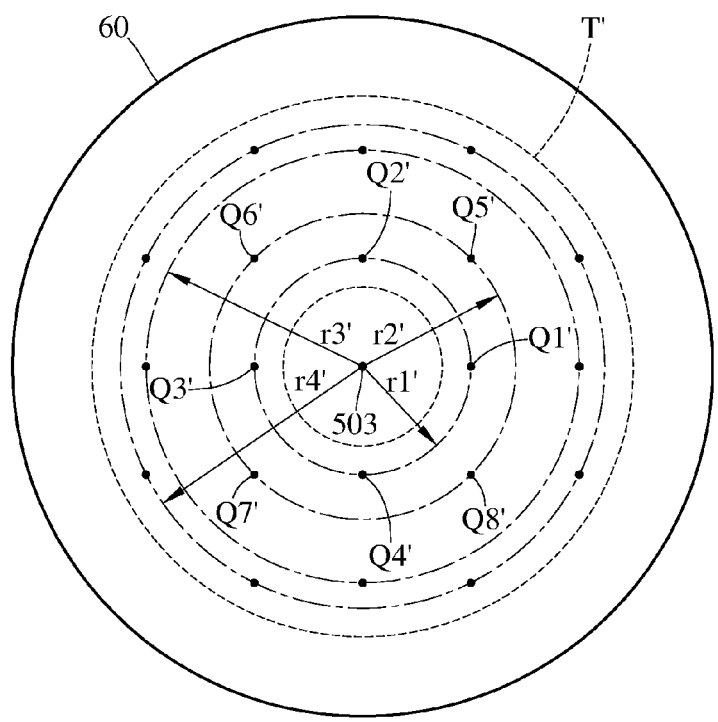
FIG. 16 is a schematic view of sampling points in at least a region of the object in the tenth embodiment of the disclosure.

Please refer to FIGS. 13, 14 and 16. FIG. 16 is a schematic view of sampling points in at least a region of the object in the tenth embodiment of the disclosure. As shown in the drawing, in this embodiment, the sampling rule applied to the object 60 by the dispersion lens assembly 5421 is that each sampling point has the same distance with another closest sampling point in at least a region T' of the surface of the object 60. In an example based on FIG. 16, in a region T' there are sampling points Q1'~Q8' arranged in a substantial matrix form, among which sampling points closest to the sampling point Q1' are the sampling points Q5' and Q8' and the distance between the sampling point Q1' and the sampling point Q5' is substantially equal to the distance between the sampling point Q1' and the sampling point Q8'.

To make sampling points of the dispersion lens assembly 5421 on the object 60 match the foregoing sampling rule, the control module 56 simultaneously adjusts the sampling frequency of the dispersion lens assembly 5421 and the rotating speed of the rotation platform 50 according to the measuring position of the dispersion lens assembly 5421 on the motion lever 521. The control module 56 controls the dispersion lens assembly 5421 to move along the motion lever 521 so that the projection of the dispersion lens assembly 5421 onto the surface of the object 60 sequentially stops at a first position, a second position, a third position and a fourth position. The distance between the first position and the rotating axis 503 is a first radius r1', the distance between the second position and the rotating axis 503 is a second radius r2', the distance between the third position and the rotating axis 503 is a third radius r3', and the distance between the fourth position and the rotating axis 503 is a fourth radius r4'. The first radius r1' to the fourth radius r4' are used to predefine the positions of sampling points. The sampling points Q1'~Q4' are located on a circle of a first radius r1' surrounding the rotating axis 503, the sampling points Q5'~Q8' are located on a circle of a second radius r2' surrounding the rotating axis 503, and it can be deduced that other sampling points are located on the circles of a third radius r3' and a fourth radius r4' surrounding the rotating axis 503.

When the dispersion lens assembly 5421 is located at the first position, the control module 56 will adjust the sampling frequency of the dispersion lens assembly 5421 and the rotating speed of the rotation platform 50 according to this preset sampling position, so as to control the dispersion lens assembly 5421 to perform a surface height measurement onto the sampling points Q1'~Q4' sequentially. When the dispersion lens assembly 5421 is located at the second position, the control module 56 will adjust the sampling frequency of the dispersion lens assembly 5421 and the rotating speed of the rotation platform 50 according to this preset sampling position, so as to control the dispersion lens assembly 5421 to perform a surface height measurement onto the sampling points Q5'~Q8' sequentially. The operations related other preset sampling positions can be deduced by analogy. When the dispersion lens assembly 5421 is located at the third position or the fourth position, the sampling frequency of the dispersion lens assembly 5421 and the rotating speed of the rotation platform 50 are adjusted according to the related preset position so that the dispersion lens assembly 5421 can perform a surface height measurement onto the other preset sampling points in the region T'.

Accordingly, in the region T' of the surface of the object 60, each sampling point has the same distance with its closest neighboring sampling points so that the dispersion lens assembly 5421 can evenly sample the object 60 to obtain the more accurate surface state of the object 60. In this embodiment, the control module 56 adjusts the sampling frequency of the dispersion lens assembly 5421 and the rotating speed of the rotation platform 50 together to make sampling points in at least the region T' of the surface of the object 60 have the same distance therebetween. In another embodiment, the control module sets the sampling frequency of the dispersion lens assembly 5421 or the rotating speed of the rotation platform 50 as a constant value and adjusts the sampling frequency or the rotating speed that is not constant previously, to make each sampling point have the same distance with its neighboring sampling points in at least the region T' of the surface of the object 60.

Figure 17A:
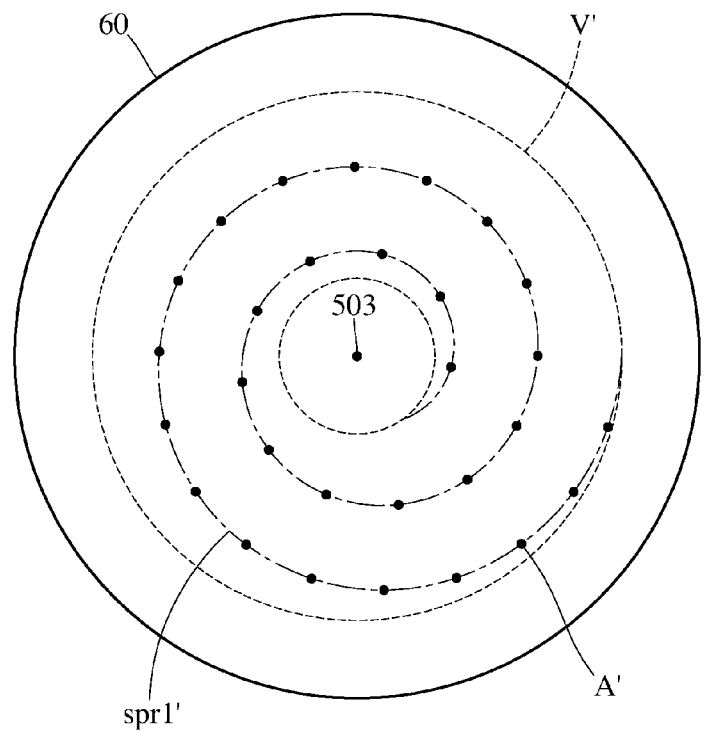
FIG. 17A is a schematic view of sampling points in at least a region of the object in the eleventh embodiment of the disclosure.
Figure 17B:
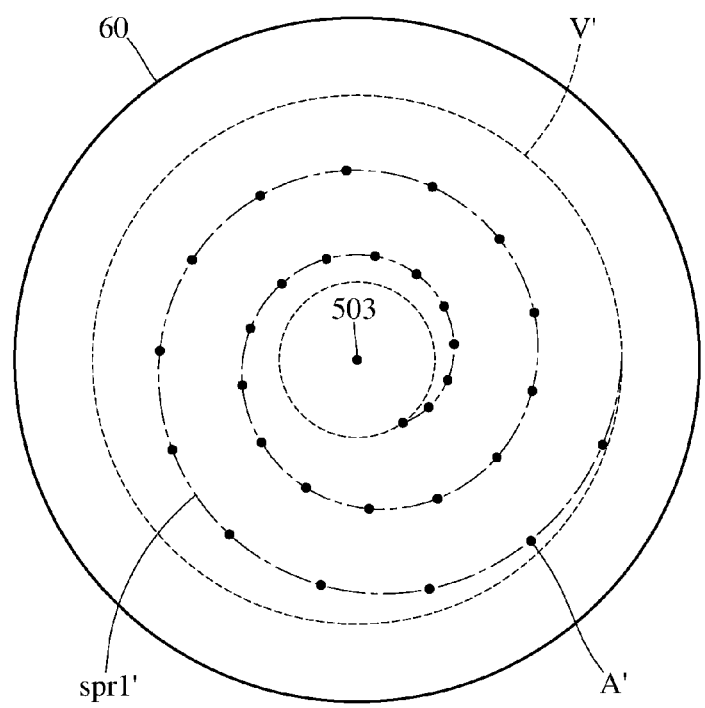
FIG. 17B is a schematic view of sampling points in at least a region of the object in the twelfth embodiment of the disclosure.

Please refer to FIGS. 13, 14, 17A and 17B. FIG. 17A is a schematic view of sampling points in at least a region of the object in the eleventh embodiment of the disclosure, and FIG. 17B is a schematic view of sampling points in at least a region of the object in the twelfth embodiment of the disclosure. As shown in the figures, in this embodiment, the dispersion lens assembly 5421 moves on the motion lever 521 from a measuring position far from the rotating axis 503 to a measuring position close to the rotating axis 503 during the sampling process onto the surface of the object 60. That is, when the rotation platform 50 is rotated, the dispersion lens assembly 5421 moves from the outer edge of a region V' to the inner edge of the region V' to make sampling points A' match another sampling rule, where the sampling points A' are arranged along a spiral line Spr1' in the region V'. In an embodiment, the center of the spiral line Spr1' is on the rotating axis 503, and windings of the spiral line Spr1' are not limited to have the same pitch therebetween. In another embodiment, a spiral line, along which the sampling points A' are arranged, sets the rotating axis 503 as its center and has windings that are distributed divergently or convergently in a direction from the rotating axis 503 to the outer edge of the region V'.

For convenience, the following description is based on an exemplary case where the windings of the spiral line Spr1' have the same pitch therebetween, and however, this embodiment is not limited thereto. In an embodiment, the control module 56 sets the rotating speed of the rotation platform 50 as a constant value and controls the dispersion lens assembly 5421 to move from the measuring position far from the rotating axis 503 to the measuring position close to the rotating axis 503 on the motion lever 521 in a constant speed, so that the dispersion lens assembly 5421 samples the surface of the object 60 along the spiral line Spr1'.

The control module 56 adjusts the sampling frequency of the dispersion lens assembly 5421 according to the measuring position of the dispersion lens assembly 5421 on the motion lever 521 to make the sampling points A' on the spiral line Spr1' match actual measurement requirements. For example, the control module 56 sets the sampling frequency of the dispersion lens assembly 5421 as a constant value so that two sequential sampling points A' sampled on the spiral line Spr1' by the dispersion lens assembly 5421 have the same distance therebetween, as shown in FIG. 17A. Alternatively, the control module 56 adjusts the sampling frequency of the dispersion lens assembly 5421 to control the distance between two sequential sampling points on the spiral line Spr1'. In another example, as shown in FIG. 17B, the control module 56 will increase the sampling frequency of the dispersion lens assembly 5421 when the dispersion lens assembly 5421 is located in the measuring position far from the rotating axis 503, the control module 56 will reduce the sampling frequency of the dispersion lens assembly 5421 when the dispersion lens assembly 5421 is located in the measuring position close to the rotating axis 503, and thus, the distance between tow sequential sampling points A' close to the rotating axis 503 is shorter than the distance between two sequential sampling points A' far from the rotating axis 503; and vice versa.

In this embodiment, for convenience, the rotating speed of the rotation platform 50 and the speed of the dispersion lens assembly 5421 moving on the motion lever 521 are set as constant values. In other embodiments, the control module 56 is not limited to control the rotating speed of the rotation platform 50 and the speed of the dispersion lens assembly 5421 moving on the motion lever 521, to make the dispersion lens assembly 5421 sample along the spiral line Spr1' on the surface of the object 60.

Figure 18A:
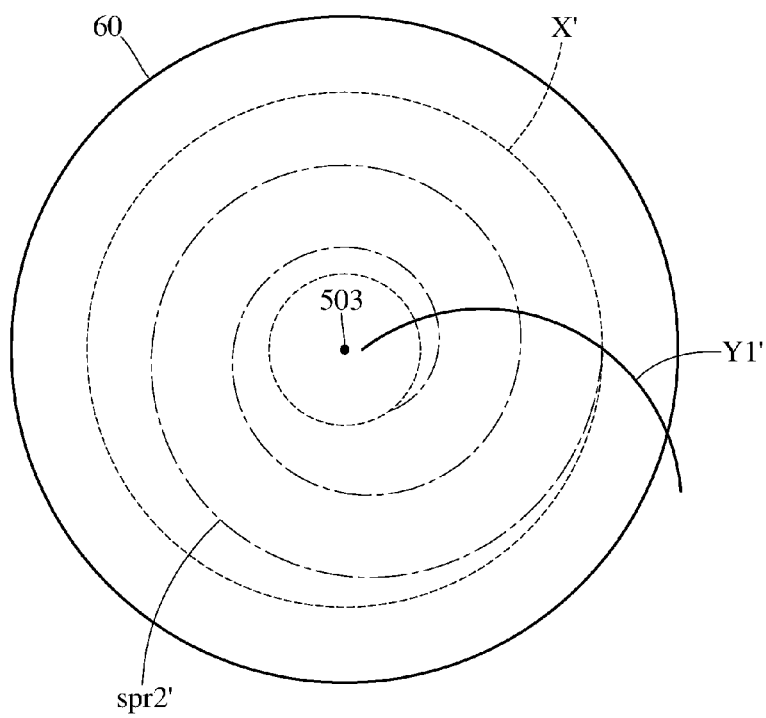
FIG. 18A is a schematic view of sampling points in at least a region of the object in the thirteenth embodiment of the disclosure.
Figure 18B:
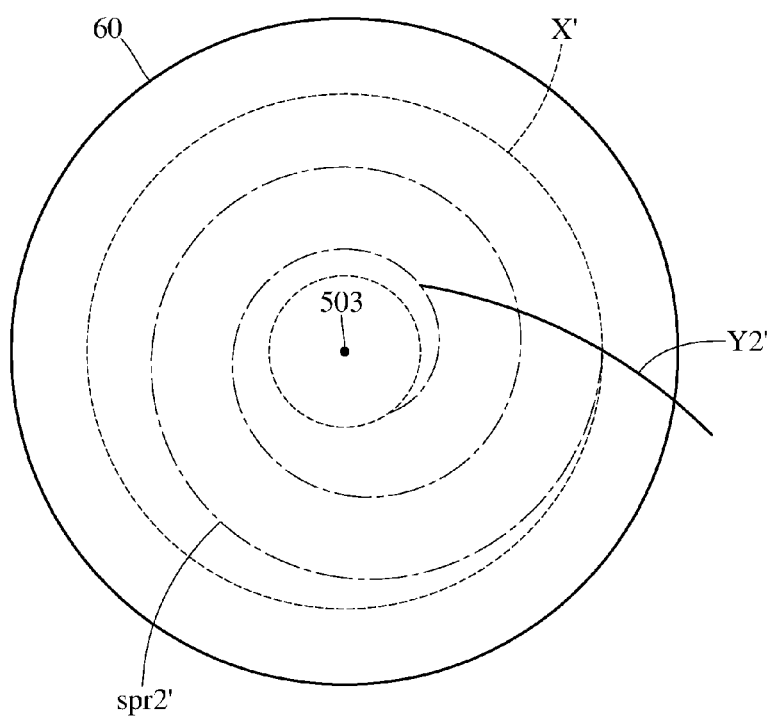
FIG. 18B is a schematic view of sampling points in at least a region of the object in the fourteenth embodiment of the disclosure.

In another embodiment, in addition to controlling the rotating speed of the rotation platform 50 and the speed of the dispersion lens assembly 5421 moving on the motion lever 521, the control module 56 further controls the moving mechanism 52 so that the motion lever 521 is movable relative to the rotation platform 50 to make the sampling path of the dispersion lens assembly 5421 on the surface of the object 60 be a spiral line. Please refer to FIGS. 13, 14, 18A and 18B. FIG. 18A is a schematic view of sampling points in at least a region of the object in the thirteenth embodiment of the disclosure, and FIG. 18B is a schematic view of sampling points in at least a region of the object in the fourteenth embodiment of the disclosure. As shown in the figures, in this embodiment, the control module 56 controls the motion lever 521 to move relative to the rotation platform 50 and controls the dispersion lens assembly 5421 to move from the outer edge of the region X' to the inner edge of the region X' in a variable speed, so that the projection of the dispersion lens assembly 5421 onto the surface of the object 60 moves along a path, like the path Y1' as shown in FIG. 18A. When setting the rotating speed of the rotation platform 50 at a constant value, the control module 56 makes the sampling points sampled in a part of the region X' in the surface of the object 60 by the dispersion lens assembly 5421 be arranged along a spiral line Spr2'. In FIG. 18B, when the control module 56 controls the dispersion lens assembly 5421 to move from the outer edge of the region X' to the inner edge of the region X' in a constant speed, the control module 56 makes the projection of the dispersion lens assembly 5421 onto the surface of the object 60 shift along a path, like the path Y2' as shown in FIG. 18B.

Similarly, the control module 56 adjusts the sampling frequency of the dispersion lens assembly 5421 according to the measuring position of the dispersion lens assembly 5421 on the motion lever 521 to make the sampling points on the spiral line Spr2' match actual measurement requirements. For example, when the control module 56 sets the sampling frequency of the dispersion lens assembly 5421 as a constant value, the control module 56 makes two sequential sampling points sampled on the spiral line Spr2' by the dispersion lens assembly 5421 have the same distance therebetween. Though the adjustment of the sampling frequency of the dispersion lens assembly 5421, the control module 56 can control the distance between two sequential sampling points on the spiral line Spr2'. In another example, as shown in FIG. 18B, when the dispersion lens assembly 5421 is located in the measuring position far from the rotating axis 503, the control module 56 may increase the sampling frequency of the dispersion lens assembly 5421; when the dispersion lens assembly 5421 is located in the measuring position close to the rotating axis 503, the control module 56 may decrease the sampling frequency of the dispersion lens assembly 5421; and thus, the distance between two sequential sampling points close to the rotating axis 503 is shorter than the distance between two sequential sampling points far from the rotating axis 503, and vice versa. This embodiment is not limited to this.

In this embodiment, the spiral line Spr2' along which sampling points are arranged surrounds the rotating axis 503 as a center, and the pitch between the windings of the spiral line Spr2' is not limited to be the same. In other embodiments, a regulation line along which sampling points are arranged may be a spiral line that surrounds the rotating axis 503 as a center and has windings that are distributed convergently or divergently in a direction from the rotating axis 503 to the outer edge of the region X'. A person of ordinary skill in the related art can, according to actual requirements, design the control module 56 to control the movement of the motion lever 521, the rotating speed of the rotation platform 50, or the speed of the dispersion lens assembly 5421 moving on the motion lever 521. When a sampling path of the dispersion lens assembly 5421 on the surface of the object 60 is a spiral line having windings having the same pitch or different pitches therebetween, the control module 56 can still adjust the sampling frequency of the dispersion lens assembly 5421 according to the measuring position of the dispersion lens assembly 5421 on the motion lever 521 to make the sampling points on the spiral line Spr2' match actual measurement requirements, and there are no more related descriptions hereafter.

Figure 19:
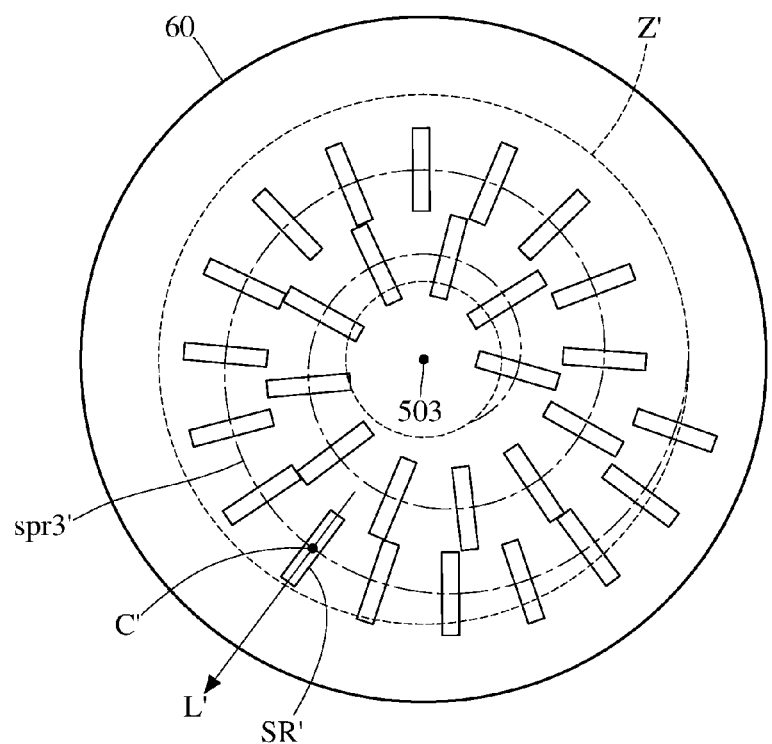
FIG. 19 is a schematic view of sampling points in at least a region of the object in the fifteenth embodiment of the disclosure.
Figure 20:
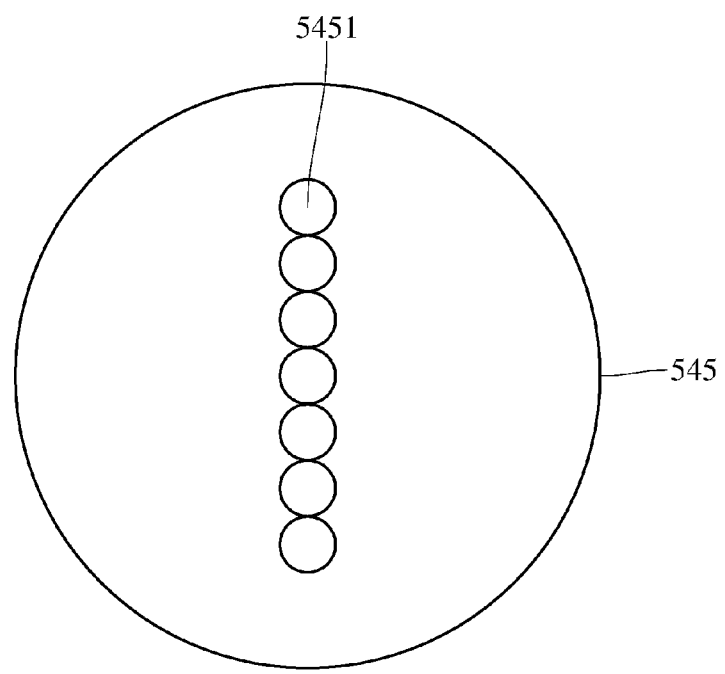
FIG. 20 is a cross-sectional view of an incident fiber cable in an embodiment of the disclosure.

In an embodiment, please refer to FIGS. 13, 14, 19 and 20, FIG. 19 is a schematic view of sampling points in at least a region of the object in the fifteenth embodiment of the disclosure, and FIG. 20 is a cross-sectional view of an incident fiber cable in an embodiment of the disclosure. As shown in the figures, in this embodiment, the light source 541 provides a plurality of measuring light beams to the dispersion lens assembly 5421, so whenever the dispersion lens assembly 5421 samples the surface of the object 60, a plurality of measuring signals will be projected to a sampling region SR' on the surface of the object 60. For example, these measuring light beams are used to respectively sampling points in the sampling region SR, these sampled points constitute a sampling region SR', and these measuring light beams are arranged in a matrix form or parallel to each other; and this embodiment is not limited to this example. In an embodiment, the incident fiber cable 545 connecting the projecting lens 542 to the light source 541 includes a plurality of transmission channels 5451. These transmission channels 5451 are arranged parallel to each other, and the transmission direction of light beam in the transmission channel 5451 is the same as the extension direction of the incident fiber cable 545. When the light source 541 provides a plurality of measuring light beams to the dispersion lens assembly 5421, each transmission channel 5451 will transmit one of the measuring light beams so that the measuring light beams are parallel transmitted to the dispersion lens assembly 5421. In an embodiment, the dispersion lens assembly 5421 also has a plurality of pinholes cooperating with the transmission channels 5451, and each pinhole is used to project a measuring light beam to the sampling region SR'.

In the embodiment shown in FIG. 19, a plurality of measuring light beams is arranged parallel to each other in a direction L' which is vertical to the tangent direction of the spiral line Spr3', and a plurality of the sampling regions SR' is arranged along the spiral line Spr3' surrounding the center C'. In an embodiment, the sampling regions SR' are related to the sampling points in the previous embodiments, and for example, the center C' of a sampling region SR' has the same position as the position of one of the sampling points in the previous embodiments. In other words, the control module 56' adjusts the sampling frequency of the dispersion lens assembly 5421 according to the measuring position of the dispersion lens assembly 5421 on the motion lever 521, to make the sampling regions on the spiral line Spr3' match actual measurement requirements, such as making two sequential sampling regions on the spiral line Spr3' have the same distance or a different distance therebetween, or making two sequential sampling regions close to the rotating axis 503 have a distance therebetween shorter or longer than the distance between two sequential sampling regions far from the rotating axis 503, and this embodiment is not limited thereto.

When the light source 541 provides a plurality of measuring light beams to the dispersion lens assembly 5421, the light source 541 and the dispersion lens assembly 5421 can also use the chromatic confocal technology, the confocal laser technology or other suitable technologies to measure the surface to be measure of the object 60. In respect to the chromatic confocal technology, each measuring light beam provided by the light source 541 has light of different wavelengths, and this light of different wavelengths is focused on a different height position after passing through a pinhole of the dispersion lens assembly 5421. In other words, a plurality of measuring light beams is focused on a plurality of measurement points at different height positions after passing through a plurality of pinholes of the dispersion lens assembly 5421. When a measuring light beam is projected onto the surface of the object 60, light focused on a different height position will be reflected by the surface of the object 60 with a different height. The reflected light is transmitted to the spectrometer 543 so that the spectrometer 543 can estimate the wavelength intensity distribution by analyzing the light reflected by the object 60.

Figure 21:
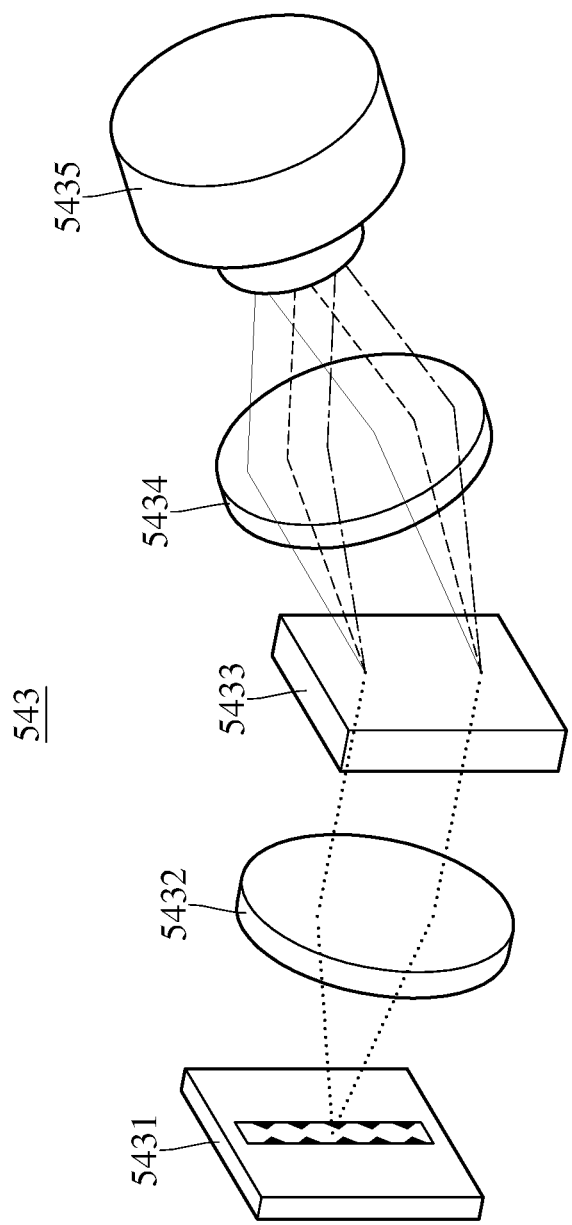
FIG. 21 is a schematic view of the spectrometer in an embodiment of the disclosure.
Figure 22:
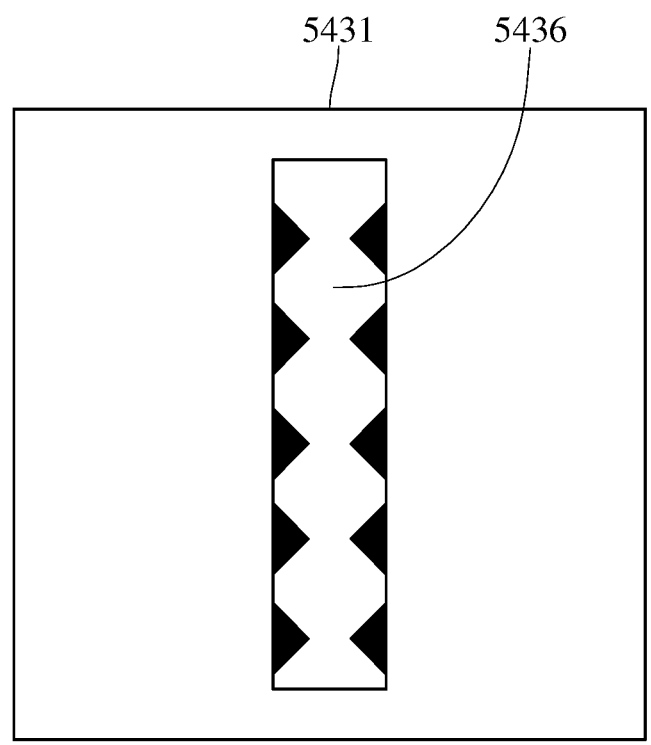
FIG. 22 is a cross-sectional view of slits in an embodiment of the disclosure.

Please refer to FIGS. 13, 14, 21 and 22. FIG. 21 is a schematic view of the spectrometer in an embodiment of the disclosure, and FIG. 22 is a cross-sectional view of slits in an embodiment of the disclosure. As shown in the drawings, the spectrometer 543 includes a slit 5431, a first lens 5432, a grating 5433, a second lens 5434 and a detector 5435. The slit 5431 includes a plurality of slots 5436, each of the slots 5436 can receive light reflected by a sampling region SR' and limit the intensity of the light passing through the slit 5431. The first lens 5432 is disposed on a path of light propagating from the slit 5431 to the grating 5433. The second lens 5434 is disposed on a path of light propagating from the grating 5433 to the detector 5435. In practice, the light reflected by the sampling region SR' is projected onto the first lens 5432 after passing through the slit 5431, so that the light reflected by the sampling region SR' is parallel projected onto the grating 5433. After receiving light passing through the first lens 5432, the grating 5433 splits the light reflected by the sampling region SR' into a plurality of color light components with different wavelengths according to the wavelength of this light, and these color light components are converged on the detector 5435 by the second lens 5434. The detector 5435 determines a wavelength intensity distribution according to the intensity of each color light component. In an embodiment, the detector 5435 is electrically connected to a computing module, which determines variances in surface height of the object 60 according to the wavelength intensity distribution obtained by the detector 5435, and however, this embodiment is not limited thereto.

Figure 23:
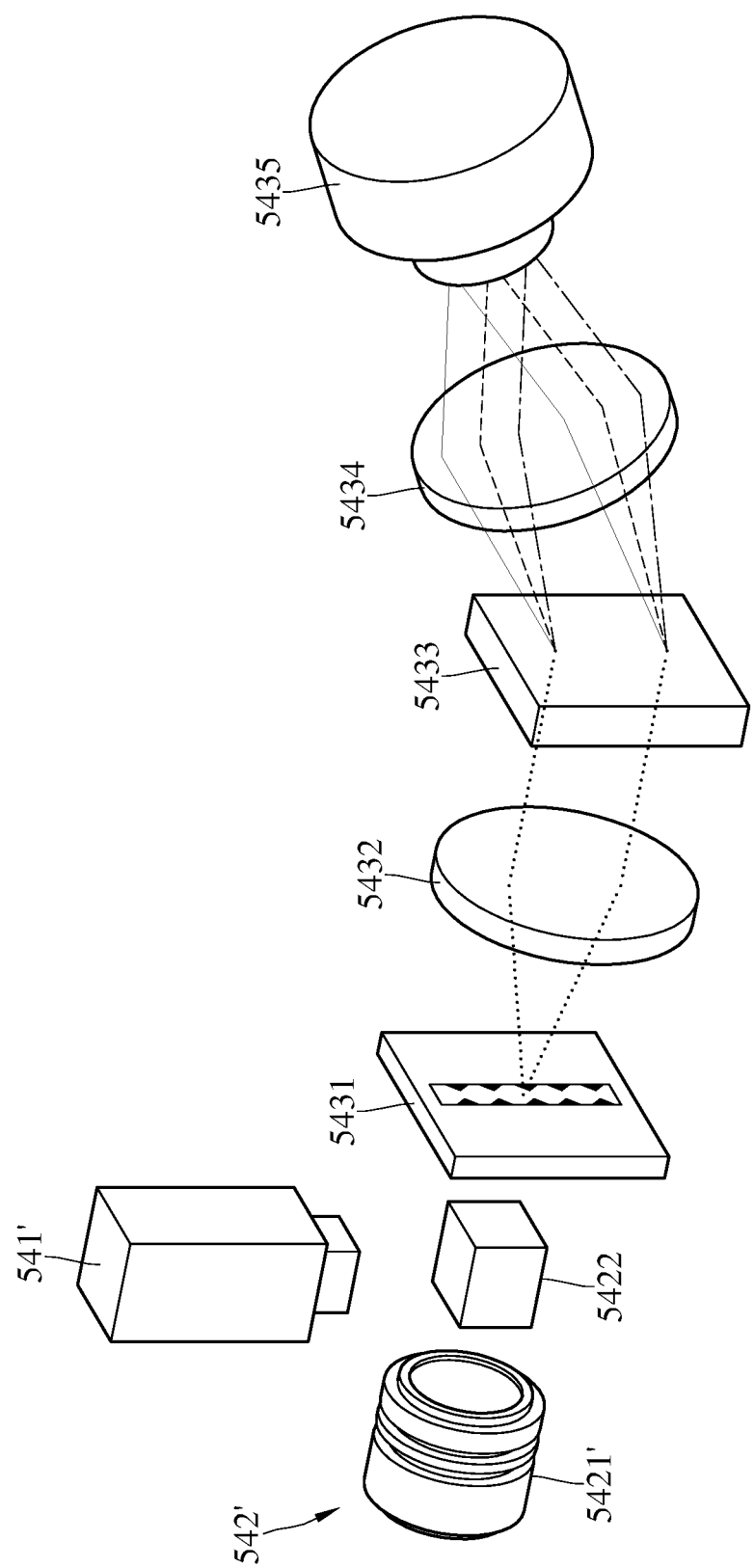
FIG. 23 is a schematic view of the measuring module and the spectrometer in another embodiment of the disclosure.

In another embodiment, please refer to FIGS. 13, 14 and 23. FIG. 23 is a schematic view of the measuring module and the spectrometer in another embodiment of the disclosure. As shown in FIG. 23, the light source 541' and the projecting lens 542' are lens type, and the projecting lens 542' includes a dispersion lens assembly 5421' and a light splitter 5422. One or more measuring light beams released by the light source 541' pass through the light splitter 5422 so that the one or more measuring light beams are reflected by the light splitter 5422 onto the dispersion lens assembly 5421' and then are converged onto a variety of height positions by the dispersion lens assembly 5421'. Light reflected by the surface of the object 60 with different heights passes through the light splitter 5422 to sequentially travel to the slit 5431, the first lens 5432, the grating 5433, the second lens 5434 and the detector 5435 of the spectrometer 543, so that the detector 5435 can determine a wavelength intensity distribution of light related to the variances in surface height of the object 60 according to the intensity of the reflected light.

Figure 24:
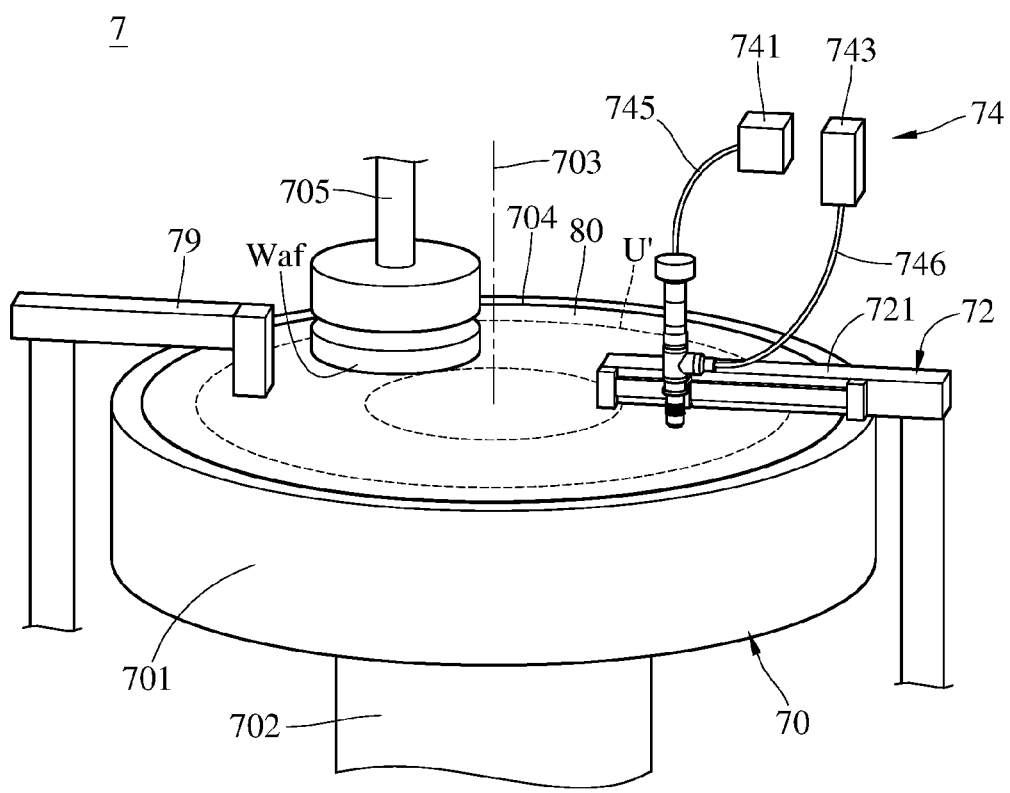
FIG. 24 is a schematic view of a surface measurement device in yet another embodiment of the disclosure.
Figure 25:
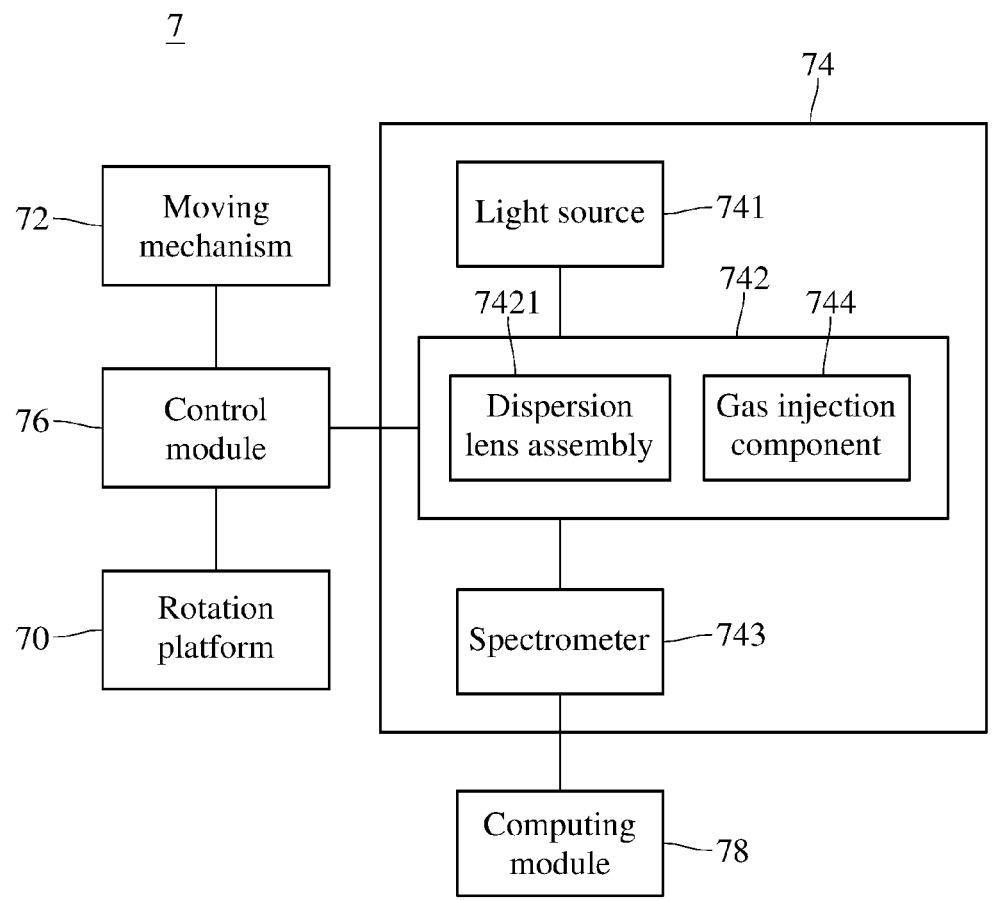
FIG. 25 is a block diagram of the surface measurement device in yet another embodiment of the disclosure.

Please refer to FIGS. 24 and 25. FIG. 24 is a schematic view of a surface measurement device in yet another embodiment of the disclosure, and FIG. 25 is a block diagram of the surface measurement device in yet another embodiment of the disclosure. As shown in the Figures, a surface measurement device 7 includes a rotation platform 70, a moving mechanism 72, a measuring module 74, a control module 76, a computing module 78 and a slurry pipe 79. The rotation platform 70 includes a carrying platform 701, a rotating shaft 702 and a polishing head 705. The carrying platform 701 is disposed on the rotating shaft 702 and is rotatable about a rotating axis 703. The carrying platform 701 has a bearing surface 704 for disposing a polishing pad 80 and permits the polishing head 705 to press a wafer Waf against the polishing pad 80. While the polishing head 705 presses the wafer Waf to make it contact the polishing pad 80, the rotation platform 70 will rotate the polishing pad 80 and the polishing head 705 will rotate the wafer Waf' so that the polishing pad 80 is movable relative to the wafer Waf' to smooth the surface of the wafer Waf. The slurry pipe 79 can provide slurry to the surface of the wafer Waf during smoothing.

The moving mechanism 72 includes a motion lever 721 located above the rotation platform 70. The measuring module 74 is movable along the motion lever 721 to perform a surface height measurement onto the surface of the polishing pad 80. Particularly, the measuring module 74 includes a light source 741, a projecting lens 742, a spectrometer 743 and a gas injection component 744. The projecting lens 742 of the measuring module 74 is movable along the motion lever 721, and the light source 741, the spectrometer 743 and the gas injection component 744 are not limited to be movable along the motion lever 721. The light source 741 of the measuring module 74 can provide one or more measuring light beams, and the measuring light beam can be transmitted to the projecting lens 742 by an input fiber cable 745. The projecting lens 742 is movable toward a variety of measuring positions on the motion lever 721 and includes a dispersion lens assembly 7421. The light source 741 projects a measuring light beam in a sampling frequency onto a plurality of sampling points on the surface of the polishing pad 80 through the dispersion lens assembly 7421. The light source 741 and the dispersion lens assembly 7421 measure the surface to be measured of the polishing pad 80 by the chromatic confocal technology, the confocal laser technology or other suitable technologies, for example.

The spectrometer 743 is connected to the projecting lens 742 through an output fiber cable 746 in order to receive light, reflected by the sampling point onto which one or more measuring light beams are projected, from the projecting lens 742 and determine a wavelength intensity distribution according to the reflected light. For example, the gas injection component 744 is disposed within the projecting lens 742, and the gas injection component 744 and the dispersion lens assembly 7421 are moveable together toward a variety of measuring positions on the motion lever 721. When the dispersion lens assembly 7421 projects a measuring light beam onto a sampling point to be measured, the gas injection component 744 will jet gas to this sampling point to be measured for cleaning particles or water film at the sampling point to be measured on the surface. Alternatively, the gas injection component 744 is disposed outside the projecting lens 742, on the motion lever 721 or other suitable position. However, the embodiment is not limited to the disposed position of the gas injection component 744.

The control module 76 is electrically connected to the rotation platform 70, the moving mechanism 72 and the measuring module 74. The control module 76 can control the measuring position and moving speed of the dispersion lens assembly 7421 on the motion lever 721, and selectively adjust the rotating speed of the rotation platform 70 or the sampling frequency, by which the light source 741 projects the measuring light beam through the dispersion lens assembly 7421, according to the measuring position of the projecting lens 742 on the motion lever 721 to make the distance between sampling points in at least a region of the surface of the object 60 match a sampling rule.

The computing module 78 is electrically connected to the spectrometer 743. The computing module 78 estimates the surface height of the polishing pad 80 according to the wavelength intensity distribution obtained by the spectrometer 743. In an example, after the spectrometer 743 obtains the surface height at each sampling point in a work region U' of the surface of the polishing pad 80 according to the foregoing present sampling rule, the spectrometer 743 determines a wavelength intensity distribution of each sampling point according to the light reflected from the sampling point. In the case of the chromatic confocal technology, light with different wavelengths is respectively projected to different positions that respectively have different heights with a sampling point along the normal line of the object 60, and then is reflected by the actual position of the sampling point. Therefore, when the spectrometer 743 senses the light beam reflected from the sampling point, the wavelength intensity distribution of this reflected light beam could present the wavelength of light that the sampling point can reflect more. The computing module 78 determines the surface height of the sampling point according to the wavelength of light that the sampling point can reflect more. The computing module 78 can determine the surface roughness of the polishing pad 80 by determining the surface height of each sampling point according to the wavelength intensity distribution related to the sampling point, and then provide it to technical personnel so that the technical personnel can decide whether to replace the polishing pad 80 according to the surface roughness of the polishing pad 80.

In an embodiment, a work region U' is defined by a region between two boundaries respectively having a first distance and a second distance with the rotating axis 703 on the top surface of the polishing pad 80 and is used to smooth the wafer Waf', and when the wafer Waf' is being smoothed, the measuring module 74 will perform a surface height measurement onto sampling points in the work region U' of the polishing pad 80. In this embodiment, the measuring module 74 only measures the surface roughness of the work region U'. However, in other embodiments, the measuring module may measure the surface roughness of the entire polishing pad 80. Moreover, the extension direction of the motion lever 721 is not limited to be parallel to the radial direction of the bearing surface 704 or the polishing pad 80. That is, the motion lever 721 can have any extension direction, and the motion lever 721 is controllable by the control module 76 to move relative to the rotation platform 70. In respect to the sampling rule suitable to this embodiment, the rotating speed, the sampling frequency and the movement of the motion lever, controllable by the control module 76, have been disclosed in the above embodiments in practice, and a person of ordinary skill in the related art can freely design them in view of the foregoing description. There are no more descriptions hereafter.

Figure 26:
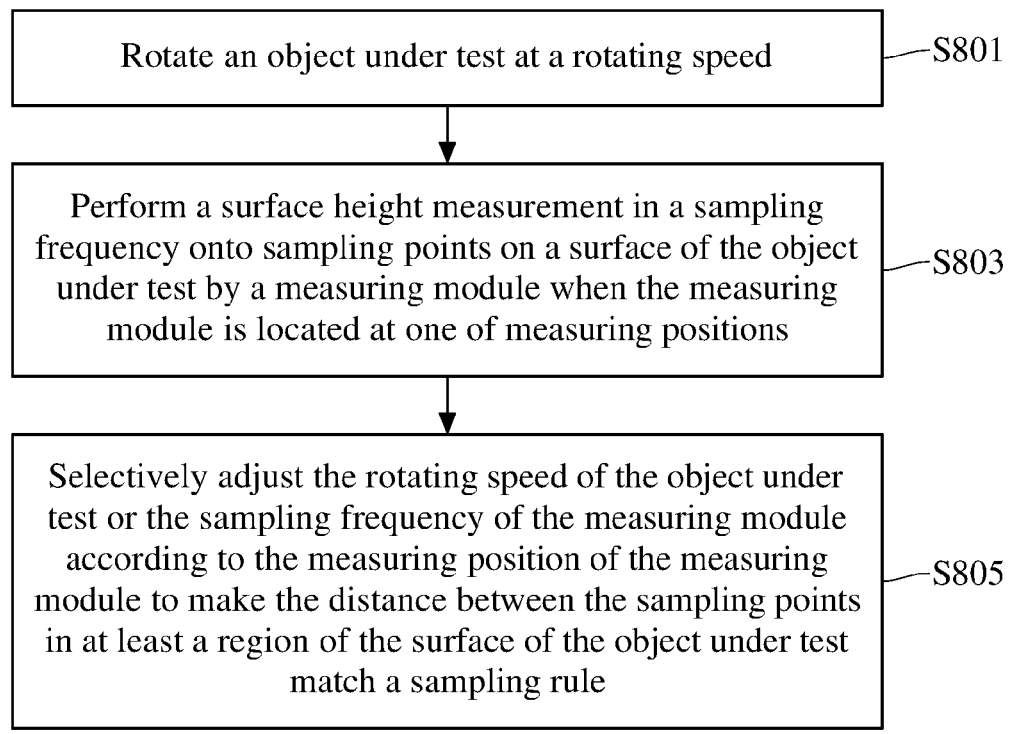
FIG. 26 is a flow chart of a surface measurement method in an embodiment of the disclosure.

Hereafter, the surface measurement method in the disclosure is explained with reference to the surface measurement device in the disclosure. Please refer to FIG. 1 and FIG. 26. FIG. 26 is a flow chart of a surface measurement method in an embodiment of the disclosure. As shown in the figures, in step S801, the rotation platform 10 rotates the object 20 at a rotating speed. In step S803, when the measuring module 14 is located at one of a plurality of measuring positions, the measuring module 14 would perform a surface height measurement in a sampling frequency onto a plurality of sampling points on the surface of the object 20. In step S805, the rotating speed of the object 20 or the sampling frequency of the measuring module 14 is selectively adjusted according to the position of the measuring module 14 on the motion lever 121, so that the distance between the sampling points in at least a region of the surface of the object 20 matches a sampling rule.

Figure 27:
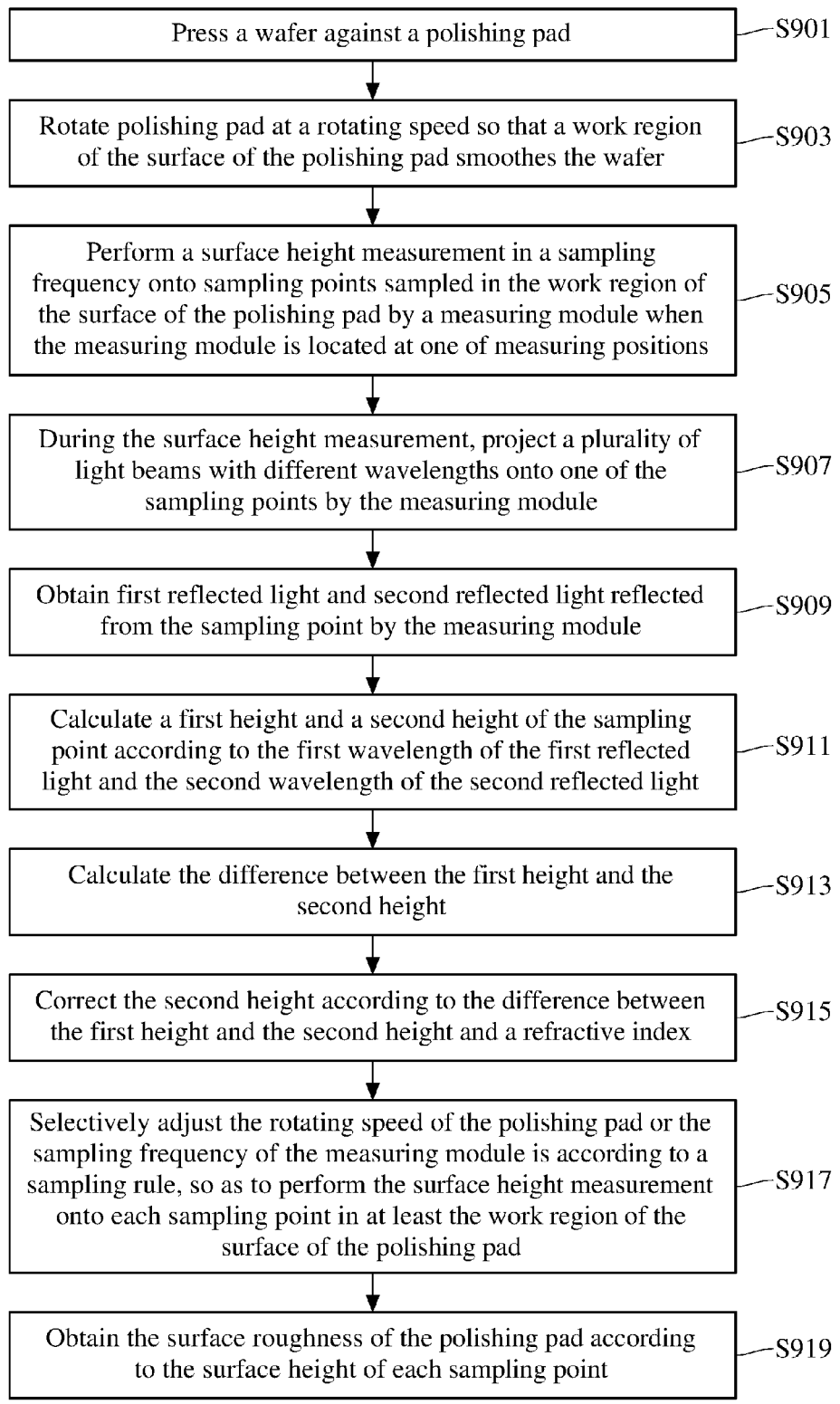
FIG. 27 is a flow chart of a surface measurement method in another embodiment of the disclosure.

In another embodiment, please refer to FIG. 9 and FIG. 27. FIG. 27 is a flow chart of a surface measurement method in another embodiment of the disclosure. In step S901, the wafer Waf is pressed against the polishing pad 40. In step S903, the polishing pad 40 is rotated at a rotating speed so that the work region U of the surface of the polishing pad 40 is used to smooth the wafer Waf. In step S905, when the measuring module 34 is located at one of a plurality of measuring positions, the measuring module 34 would perform a surface height measurement in a sampling frequency onto a plurality of sampling points in the work region U of the surface of the polishing pad 40. During the surface height measurement, in step S907, the measuring module 34 projects a plurality of light beams with different wavelengths onto one of the sampling points. In step S909, the measuring module 34 obtains first reflected light and second reflected light reflected from the sampling point. In step S911, a first height and a second height of the sampling point is calculated according to the first wavelength of the first reflected light and the second wavelength of the second reflected light. In step S913, the difference between the first height and the second height is calculated. In step S915, the second height is corrected according to the difference between the first height and the second height and a refractive index. The refractive index is related to a medium between the first height and the second height of the sampling point to be measured. In step S917, the rotating speed of the polishing pad 40 or the sampling frequency of the measuring module 34 is selectively adjusted according to a sampling rule, so as to perform the surface height measurement onto each sampling point in at least the work region U of the surface of the polishing pad 40. In step S919, the surface roughness of the polishing pad 40 is obtained according to the surface height of each sampling point. The surface measurement method in the disclosure has been explained in detail in the foregoing embodiments and thus, there is no more related description hereafter.

To sum up, the disclosure provides a surface measurement device and a method thereof to selectively adjust the rotating speed of a rotation platform or the sampling frequency of a measuring module according to the measuring position of the measuring module on the motion lever by the control module so that the disclosure can evenly sample the surface of an object that is rotating. Therefore, the technical personnel may accurately handle the surface state of the object. In an embodiment of the disclosure, the surface measurement device can be further applied to the chemical-mechanical polishing technology to enable the surface measurement device to perform a surface measurement to a polishing pad to evenly sample the polishing pad while a wafer is being smoothed by the polishing pad, so that the technical personnel may obtain the accurate abrasion state of the polishing pad to decide whether to replace the polishing pad. Accordingly, the efficiency of the chemical-mechanical polishing technology may be greatly enhanced as the cost of polishing semiconductor wafers is efficiently controlled.

What is claimed is:

1. A surface measurement device, comprising:
a rotation platform configured to bear an object and rotate the object at a rotating speed;
a motion lever located above the rotation platform;
a measuring apparatus located on the motion lever, movable to a plurality of measuring positions on the motion lever, and configured to perform a surface height measurement in a sampling frequency onto a plurality of sampling points on a surface of the object when located at one of the measuring positions; and
a control module in a processor to selectively adjust the rotating speed of the rotation platform or the sampling frequency of the measuring apparatus according to the measuring positions of the measuring apparatus on the motion lever to make distances between the sampling points in at least a region of the surface of the object matches a sampling rule.

2. The surface measurement device according to claim 1, wherein when each sampling point in at least a region of the surface of the object has the same distance with other closest sampling point, the sampling points in at least a region of the surface of the object match the sampling rule.

3. The surface measurement device according to claim 1, wherein when the control module maintains the rotating speed of the rotation platform, the control module adjusts the sampling frequency of the measuring apparatus according to the measuring position of the measuring apparatus on the motion lever.

4. The surface measurement device according to claim 3, wherein when the measuring position of the measuring apparatus on the motion lever is a preset position and the sampling frequency of the measuring apparatus arrives a preset frequency, the control module adjusts the rotating speed of the rotation platform.

5. The surface measurement device according to claim 1, wherein when the control module maintains the sampling frequency of the measuring apparatus, the control module adjusts the rotating speed of the rotation platform according to the measuring position of the measuring apparatus on the motion lever.

6. The surface measurement device according to claim 5, wherein when the measuring position of the measuring apparatus on the motion lever is a preset position and the rotating speed of the rotation platform arrives a preset speed, the control module adjusts the sampling frequency of the measuring apparatus.

7. The surface measurement device according to claim 1, wherein the rotation platform has a rotating axis and comprises a polishing head, the object is a polishing pad, the object rotates about the rotating axis, and the polishing head presses against a wafer onto the object so that the object rotated by the rotation platform contacts the wafer to smooth the wafer.

8. The surface measurement device according to claim 7, wherein a work region is defined between two boundaries, which respectively have a first distance and a second distance with the rotating axis, in a top surface of the object, the work region of the object is used to smooth the wafer, and when the wafer is being smoothed, the measuring apparatus selectively performs the surface height measurement onto the sampling points in the work region of the object and the sampling points in the work region match the sampling rule.

9. The surface measurement device according to claim 8, wherein a projection of the motion lever on the surface of the object extends at least from the boundary having the first distance with the rotating axis to the boundary having the second distance with the rotating axis.

10. The surface measurement device according to claim 1, wherein the measuring apparatus projects a plurality of light beams with different wavelengths to measure one of the sampling points and then obtain at least one reflected light beam reflected by the sampling point to be measured, and the measuring apparatus estimates a surface height of the sampling point to be measured according to the wavelength of the at least one reflected light beam.

11. The surface measurement device according to claim 10, further comprising:
a computing module configured to calculate a first height and a second height of the sampling point to be measured according to a first wavelength of first reflected light and a second wavelength of second reflected light in the reflected light beam obtained by the measuring apparatus, calculate a difference between the first height and the second height, and correct the second height according to the difference between the first height and the second height and a refractive index,
wherein the corrected second height is considered the surface height of the sampling point to be measured, the first wavelength is shorter than the second wavelength, and the refractive index is related to a medium between the first height and the second height of the sampling point to be measured.

12. The surface measurement device according to claim 11, wherein the computing module obtains a surface roughness of the object according to the surface height of each sampling point.

13. The surface measurement device according to claim 10, wherein the measuring apparatus further comprises a gas injection component configured to perform a surface clean onto the sampling point to be measured when the measuring apparatus projects the light beams to one of the sampling points for measurement.

14. The surface measurement device according to claim 1, wherein whenever the measuring apparatus performs the surface height measurement onto one of the sampling points, the measuring apparatus further performs the surface height measurement onto a sampling region on the surface of the object by a plurality of measuring signals, and the sampling region is related to the sampling point.

15. The surface measurement device according to claim 14, wherein when each sampling point in at least a region of the surface of the object is arranged along a spiral line, the sampling points in at least the region of the surface of the object match the sampling rule, and a center of the spiral line is a rotating axis of the rotation platform.

16. The surface measurement device according to claim 15, wherein the control module further controls the motion lever to move relative to the rotation platform so that the distance between the sampling points in at least the region of the surface of the object matches the sampling rule.

17. A surface measurement device, comprising:
a rotation platform configured to bear an object and rotate the object at a rotating speed;
a motion lever located above the rotation platform;
a measuring apparatus comprising:
a light source configured to provide a measuring light beam;
a dispersion lens assembly connected to the light source and being movable to a plurality of measuring positions on the motion lever;
a spectrometer connected to the dispersion lens assembly and configured to determine a wavelength intensity distribution by analyzing a reflected light beam reflected from one of a plurality of sampling points on a surface of the object when the dispersion lens assembly is located one of the measuring positions and the light source projects the measuring light beam onto the sampling point in a sampling frequency through the dispersion lens assembly, wherein the wavelength intensity distribution is related to one or more surface heights of the sampling point; and
a gas injection component configured to perform a surface clean onto the sampling point when the dispersion lens assembly projects the measuring light beam onto one of the sampling points; and
a control module in a processor configured to selectively adjust the rotating speed of the rotation platform or the sampling frequency, in which the light source projects the measuring light beam through the dispersion lens assembly, according to a position of the dispersion lens assembly on the motion lever, so as to make one or more distances between the sampling points in at least a region of the surface of the object match a sampling rule.

18. The surface measurement device according to claim 17, wherein when each sampling point in at least a region of the surface of the object has the same distance with other closest sampling points, the sampling points in at least the region of the surface of the object match the sampling rule.

19. The surface measurement device according to claim 17, wherein when the control module maintains the rotating speed of the rotation platform, the control module adjusts the sampling frequency, in which the light source projects the measuring light beam through the dispersion lens assembly, according to the measuring position of the dispersion lens assembly the motion lever.

20. The surface measurement device according to claim 19, wherein the control module adjusts the rotating speed of the rotation platform when the measuring position of the dispersion lens assembly on the motion lever is a preset position and the sampling frequency, in which the light source projects the measuring light beam through the dispersion lens assembly, arrives a preset frequency.

21. The surface measurement device according to claim 17, wherein the control module adjusts the rotating speed of the rotation platform according to the measuring position of the dispersion lens assembly on the motion lever when the control module sets the sampling frequency to be constant, in which the light source projects the measuring light beam through the dispersion lens assembly.

22. The surface measurement device according to claim 21, wherein the control module adjusts the sampling frequency, in which the light source projects the measuring light beam through the dispersion lens assembly, when the measuring position of the dispersion lens assembly on the motion lever is a preset position and the rotating speed of the rotation platform arrives a preset speed.

23. The surface measurement device according to claim 17, wherein the rotation platform has a rotating axis and comprises a polishing head, the object is a polishing pad, the object is rotatable about the rotating axis, the polishing head is used to press a wafer against the object so the object rotated by the rotation platform contacts the wafer to smooth the wafer.

24. The surface measurement device according to claim 23, wherein a work region is defined between boundaries, which respectively have a first distance and a second distance with the rotating axis, in top surface of the object, the work region of the object is used to smooth the wafer, and when the wafer is being smoothed, the light source projects the measuring light beam onto the sampling points in the work region through the dispersion lens assembly and the sampling points in the work region match the sampling rule.

25. The surface measurement device according to claim 24, wherein a projection of the motion lever onto the object extends at least from a position having the first distance with the rotating axis to a position having the second distance with the rotating axis.

26. The surface measurement device according to claim 17, wherein the number of measuring light beams provided by the light source is plural, the dispersion lens assembly comprises a plurality of pinholes, and whenever the measuring apparatus samples one of the sampling points, one of the measuring light beams is projected from each of the pinholes of the dispersion lens assembly onto a sampling region on the surface of the object, and the sampling region is related to the sampling point.

27. The surface measurement device according to claim 26, wherein each of the measuring light beams comprises light with different wavelengths, the dispersion lens assembly obtains a reflected light beam from the sampling region onto which the light with different wavelengths is projected, and sends the reflected light beam to the spectrometer, and the spectrometer determines the wavelength intensity distribution by analyzing the reflected light beam.

28. The surface measurement device according to claim 27, wherein the spectrometer comprises:
a slit comprising a plurality of slots, and each of the slots configured to receive the reflected light beam;
a grating configured to receive the reflected light beam reflected from the sampling region through the slit, and split up the reflected light beam into a plurality of color light components with different wavelengths; and
a detector configured to detect the color light components and determine the wavelength intensity distribution according to intensity of each of the color light components.

29. The surface measurement device according to claim 28, wherein the spectrometer further comprises a first lens and a second lens, the first lens is disposed on a path that the slit sends the reflected light beam to the grating and configured to parallel project the light beam passing the slit onto the grating, and the second lens is disposed a path that the grating sends the color light components to the detector and configured to merge the color light components on the detector.

30. The surface measurement device according to claim 27, wherein when the sampling points in at least a region of the surface of the object are arranged along a spiral line, the sampling points in at least the region of the surface of the object match the sampling rule, and a center of the spiral line is on a rotating axis of the rotation platform.

31. The surface measurement device according to claim 30, wherein the control module further controls the motion lever to move relative to the rotation platform so that a distance between the sampling points in at least a region of the surface of the object matches the sampling rule.

32. A surface measurement method, comprising:
rotating an object at a rotating speed;
performing a surface height measurement in a sampling frequency onto a plurality of sampling points on a surface of the object by a measuring apparatus when the measuring apparatus is located at one of a plurality of measuring positions; and
selectively adjusting the rotating speed of the object or the sampling frequency of the measuring apparatus according to the measuring position of the measuring apparatus to make a distance between the sampling points in at least a region of the surface of the object match a sampling rule.

33. The surface measurement method according to claim 32, wherein when each sampling point in at least the region of the surface of the object has the same distance with other closest sampling points, the sampling points in at least the region of the surface of the object match the sampling rule.

34. The surface measurement method according to claim 32, wherein selectively adjusting the rotating speed of the object or the sampling frequency of the measuring apparatus comprises:
adjusting the sampling frequency of the measuring apparatus according to the measuring position of the measuring apparatus on a motion lever when the rotating speed of the object is maintained.

35. The surface measurement method according to claim 34, wherein selectively adjusting the rotating speed of the object or the sampling frequency of the measuring apparatus further comprises:
adjusting the rotating speed of the object when the measuring position of the measuring apparatus is a preset position and the sampling frequency of the measuring apparatus arrives a preset frequency.

36. The surface measurement method according to claim 32, wherein selectively adjusting the rotating speed of the object or the sampling frequency of the measuring apparatus further comprises:
adjusting the rotating speed of a rotation platform according to the measuring position of the measuring apparatus on a motion lever when the sampling frequency of the measuring apparatus is maintained.

37. The surface measurement method according to claim 36, wherein selectively adjusting the rotating speed of the object or the sampling frequency of the measuring apparatus further comprises:
adjusting the sampling frequency of the measuring apparatus when the measuring position of the measuring apparatus is a preset position and the rotating speed of the object arrives a preset speed.

38. The surface measurement method according to claim 32, wherein rotating the object at the rotating speed comprises:

pressing a wafer against the object; and
smoothing the wafer by the object.

39. The surface measurement method according to claim 38, wherein a work region is defined between boundaries which respectively have a first distance and a second distance with a rotating center in a top surface of the object, the work region of the object is used to smooth the wafer, and when the wafer is being smoothed, the measuring apparatus selectively performs the surface height measurement onto the sampling points in the work region of the object and the sampling points in the work region match the sampling rule.

40. The surface measurement method according to claim 39, wherein the measuring positions comprise at least a first measuring position and a second measuring position, the first distance is defined by a distance between a position of a projection of the first measuring position on the surface of the object and the rotating center, and the second distance is defined by a distance between a position of a projection of the second measuring position on the surface of the object and the rotating center.

41. The surface measurement method according to claim 32, wherein performing the surface height measurement in the sampling frequency onto the sampling points on the surface of the object by the measuring apparatus comprises:
projecting a plurality of light beams with different wavelengths onto one of the sampling points by the measuring apparatus;
obtaining at least one reflected light beam reflected from the sampling point to be measured by the measuring apparatus; and
determining a wavelength intensity distribution related to a surface height of the sampling point according to a wavelength of the at least one reflected light beam by the measuring apparatus.

42. The surface measurement method according to claim 41, wherein when the reflected light beam obtained by the measuring apparatus comprises first reflected light and second reflected light, calculating the surface height of the sampling point to be measured according to the wavelength of the at least one reflected light beam comprises:
calculating a first height and a second height of the sampling point to be measured according to a first wavelength of the first reflected light and a second wavelength of the second reflected light;
calculating a difference between the first height and the second height; and
correcting the second height according to the difference between the first height and the second height and a refractive index, and setting the corrected second height as the surface height of the sampling point to be measured;
wherein the first wavelength is shorter than the second wavelength, the refractive index is related to a medium located between the first height and the second height of the sampling point to be measured.

43. The surface measurement method according to claim 42, further comprising:
obtaining a surface roughness of the object according to the surface height of each of the sampling points.

44. The surface measurement method according to claim 43, wherein projecting the light beams onto one of the sampling points by the measuring apparatus comprises performing a surface clean onto the sampling point to be measured.

45. The surface measurement method according to claim 32, wherein whenever the measuring apparatus performs the surface height measurement onto one of the sampling points, the measuring apparatus further uses a plurality of measuring signals to perform the surface height measurement onto a sampling region on the surface of the object, and the sampling region is related to the sampling point.

46. The surface measurement method according to claim 45, wherein when the sampling points in at least a region of the surface of the object are arranged along a spiral line, the sampling points in at least the region of the surface of the object match the sampling rule, and a center of the spiral line is on a rotating axis of a rotation platform.

47. The surface measurement method according to claim 46, wherein the measuring apparatus is disposed on a motion lever, the object is disposed on a rotation platform, and the surface measurement method further comprises:
controlling the motion lever to move relative to the rotation platform so that a distance between the sampling points in at least a region of the surface of the object matches the sampling rule.

48. The surface measurement method according to claim 46, wherein each of the measuring light beams comprises light with different wavelengths, and the measuring apparatus determines wavelength intensity distribution according to intensity of the light beam reflected from the sampling region onto which the light with different wavelengths is projected.

* * * * *